(12) United States Patent
Hatanaka

(10) Patent No.: US 12,652,457 B2
(45) Date of Patent: Jun. 9, 2026

(54) IMAGING APPARATUS, IMAGING CONTROL METHOD, AND PROGRAM

(71) Applicant: Sony Group Corporation, Tokyo (JP)

(72) Inventor: Fumikazu Hatanaka, Tokyo (JP)

(73) Assignee: Sony Group Corporation, Tokyo (JP)

( * ) Notice: Subject to any disclaimer, the term of this patent is extended or adjusted under 35 U.S.C. 154(b) by 198 days.

(21) Appl. No.: 18/261,924

(22) PCT Filed: Dec. 17, 2021

(86) PCT No.: PCT/JP2021/046767
§ 371 (c)(1),
(2) Date: Jul. 18, 2023

(87) PCT Pub. No.: WO2022/158203
PCT Pub. Date: Jul. 28, 2022

(65) Prior Publication Data
US 2024/0080411 A1     Mar. 7, 2024

(30) Foreign Application Priority Data
Jan. 25, 2021     (JP) ................................. 2021-009542

(51) Int. Cl.
*H04N 23/63* (2023.01)
*H04N 23/667* (2023.01)
(52) U.S. Cl.
CPC ......... *H04N 23/631* (2023.01); *H04N 23/667* (2023.01)
(58) Field of Classification Search
CPC ..... H04N 23/62; H04N 23/631; H04N 23/667
See application file for complete search history.

(56) References Cited

U.S. PATENT DOCUMENTS

| | | | |
|---|---|---|---|
| 2013/0294741 A1* | 11/2013 | Mizuno .................... | H04N 9/87 |
| | | | 386/224 |
| 2014/0186006 A1* | 7/2014 | Jin .......................... | H04N 5/783 |
| | | | 386/230 |
| 2016/0173810 A1* | 6/2016 | Nakagawa ......... | G11B 27/3027 |
| | | | 386/225 |
| 2017/0195571 A1 | 7/2017 | Kittaneh | |
| 2020/0382723 A1* | 12/2020 | Pena .................... | H04N 23/683 |
| 2022/0201221 A1* | 6/2022 | Ogawa ................. | H04N 23/631 |

FOREIGN PATENT DOCUMENTS

| | | |
|---|---|---|
| JP | 2008244899 A | 10/2008 |
| JP | 2010004281 A | 1/2010 |
| JP | 2012100149 A | 5/2012 |

OTHER PUBLICATIONS

International Search Report (PCT/ISA/210), International Application No. PCT/JP2021/046767, dated Mar. 8, 2022.

* cited by examiner

*Primary Examiner* — Daniel M Pasiewicz
(74) *Attorney, Agent, or Firm* — Michael Best & Friedrich LLP

(57)     ABSTRACT

Provided is an imaging apparatus which allows, for all or some of multiple frame rate modes, selection of multiple frame rates including a frame rate same as that in another frame rate mode. Moreover, the imaging apparatus is configured to carry out control to perform frame rate setting in each frame rate mode according to an operation.

6 Claims, 14 Drawing Sheets

| | | |
|---|---|---|
| ▭ | | SINGLE SHOOTING MODE |
| ▱ H+ | | |
| ▱ H | | CONTINUOUS SHOOTING MODE |
| ▱ M | | |
| ▱ L | | |
| ⟳ | | DELAYED-ACTION |
| BRK | | BRACKET |

F I G . 4
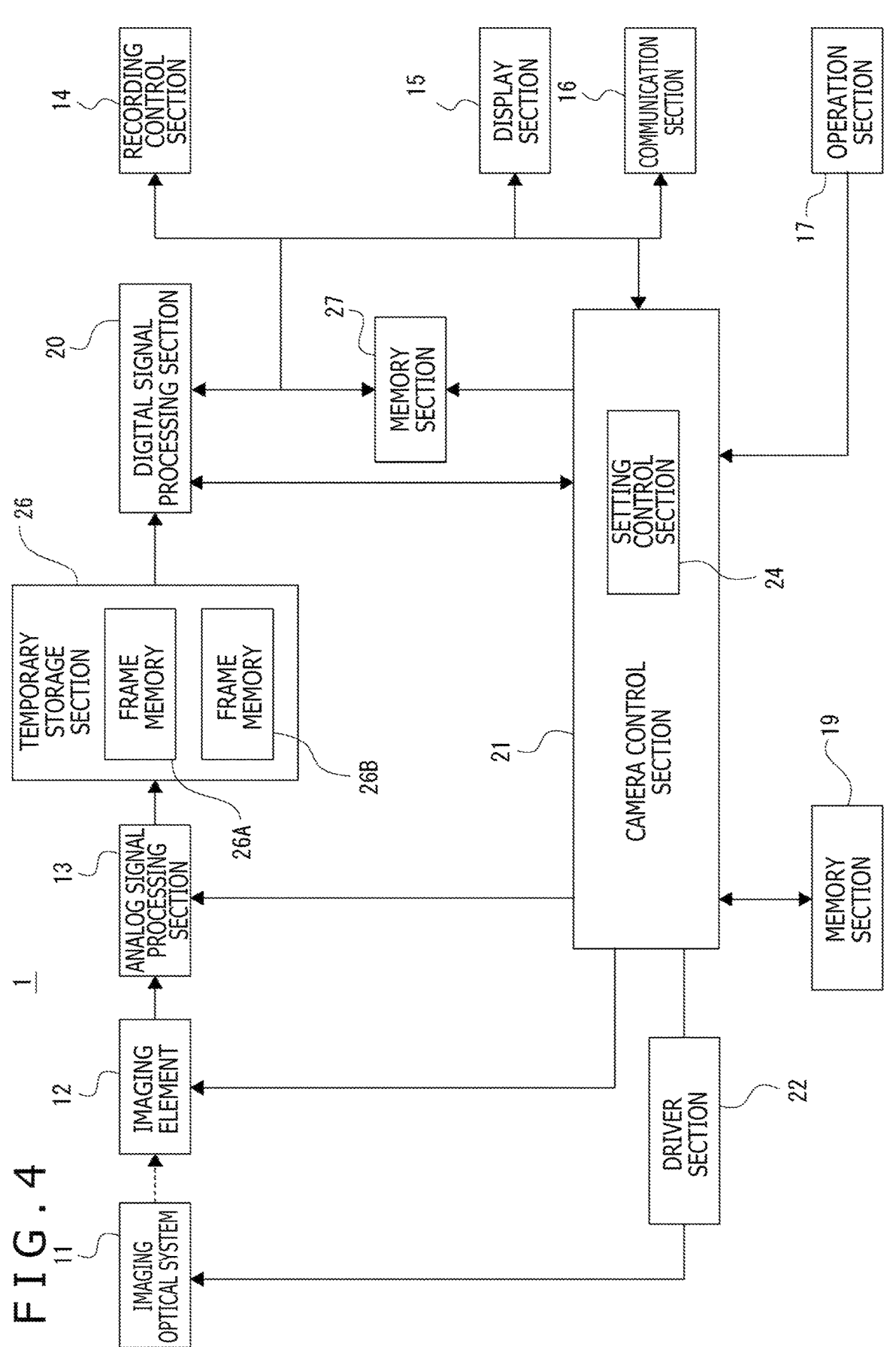

FIG.6
A
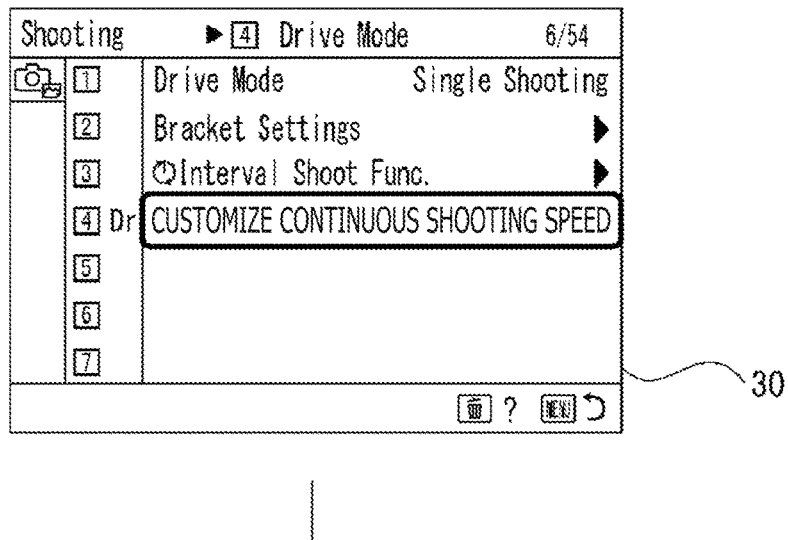
B
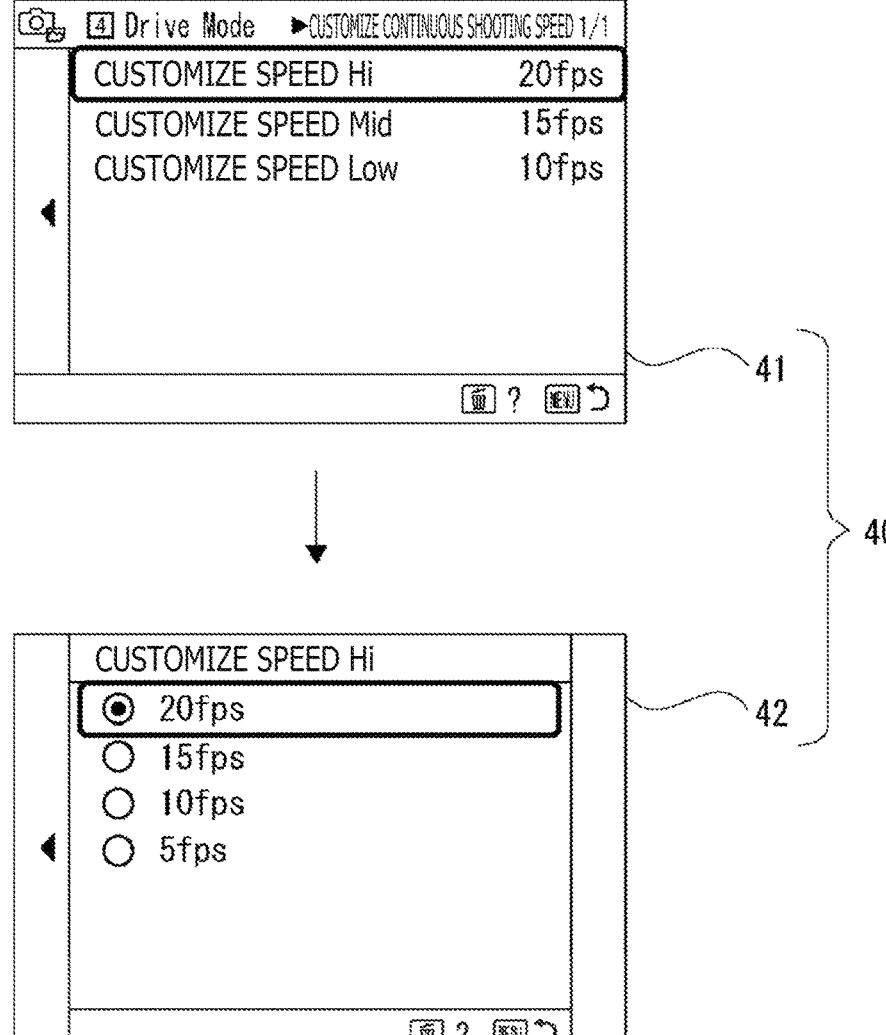
C

F I G . 7
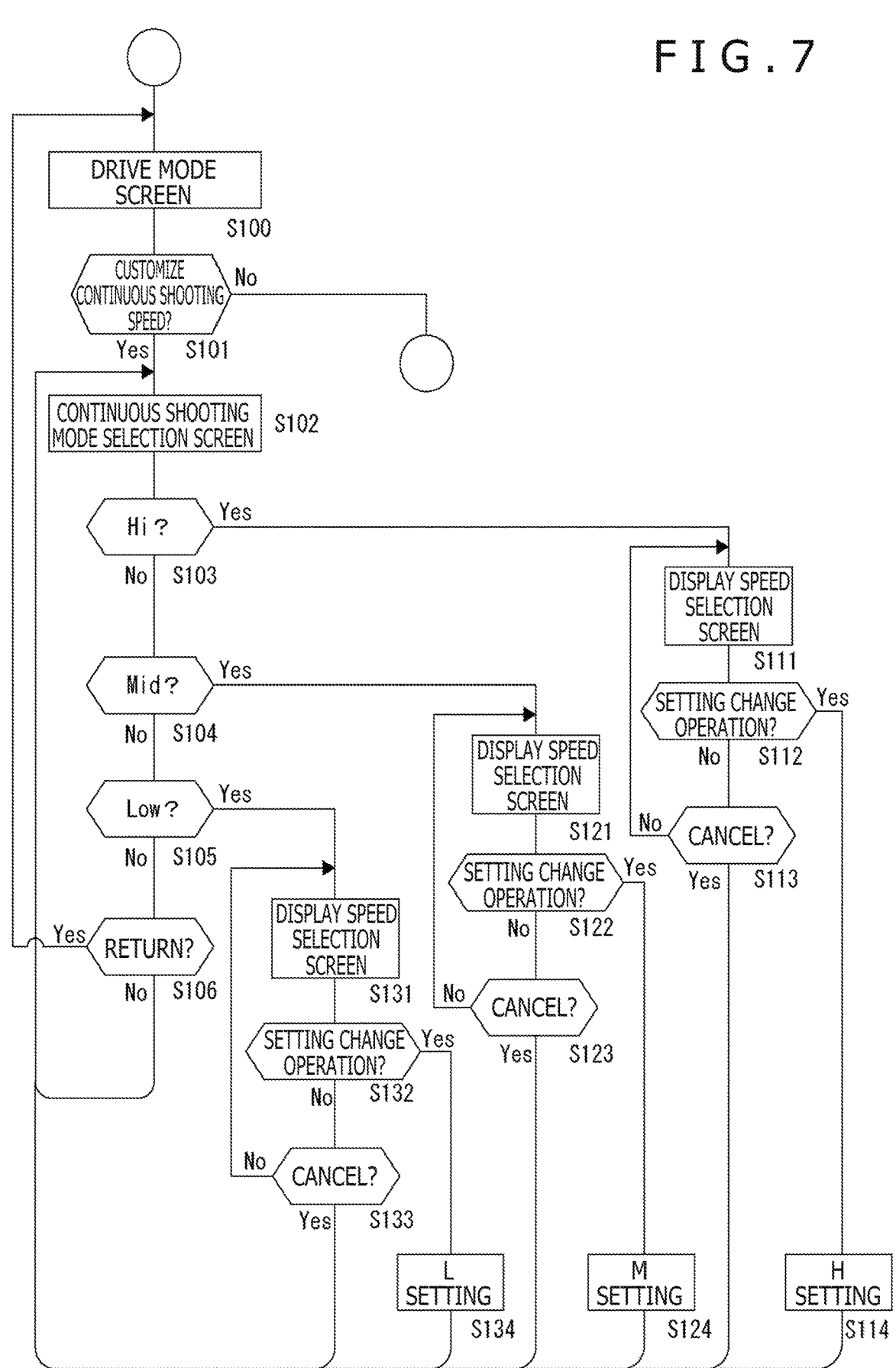

FIG.8

CASE OF SELECTION OF Hi

| CASE | Hi OPTIONS | | | | Mid SETTING |
|------|------|------|------|------|------|
| H1 | 20 fps | ● | ● | ● | 20 fps |
| H2 | 20 fps | 15 fps | ● | ● | 15 fps |
| H3 | 20 fps | 15 fps | 10 fps | ● | 10 fps |
| H4 | 20 fps | 15 fps | 10 fps | 5 fps | 5 fps |

FIG.9

CASE OF SELECTION OF Low

| CASE | Mid SETTING | Low OPTIONS | | | |
|------|------|------|------|------|------|
| L1 | 20 fps | 20 fps | 15 fps | 10 fps | 5 fps |
| L2 | 15 fps | ● | 15 fps | 10 fps | 5 fps |
| L3 | 10 fps | ● | ● | 10 fps | 5 fps |
| L4 | 5 fps | ● | ● | ● | 5 fps |

F I G . 1 0

CASE OF SELECTION OF Mid

| CASE | Hi SETTING | Mid OPTIONS (20fps / 15fps / 10fps / 5fps) | | | | Low SETTING |
|------|-----------|------|------|------|------|------------|
| M1 | 20 fps | 20 fps | 15 fps | 10 fps | 5 fps | 5 fps |
| M2 | 15 fps | ● | 15 fps | 10 fps | 5 fps | 5 fps |
| M3 | 10 fps | ● | ● | 10 fps | 5 fps | 5 fps |
| M4 | 5 fps | ● | ● | ● | 5 fps | 5 fps |
| M5 | 20 fps | 20 fps | 15 fps | 10 fps | ● | 10 fps |
| M6 | 15 fps | ● | 15 fps | 10 fps | ● | 10 fps |
| M7 | 10 fps | ● | ● | 10 fps | ● | 10 fps |
| M8 | 20 fps | ● | 15 fps | 10 fps | ● | 15 fps |
| M9 | 15 fps | ● | 15 fps | ● | ● | 15 fps |
| M10 | 20 fps | 20 fps | ● | ● | ● | 20 fps |

41A

F I G . 1 3
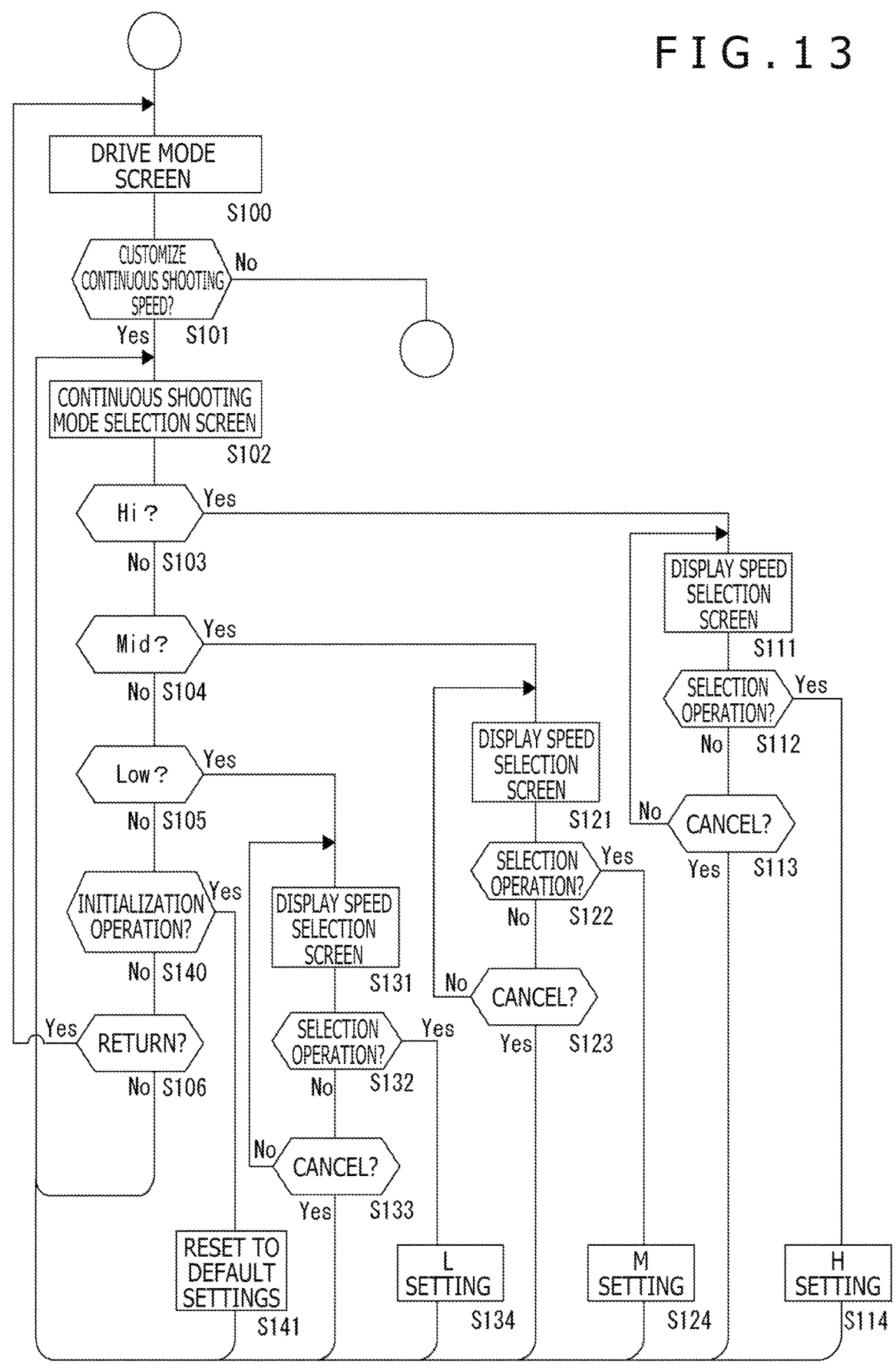

F I G . 1 4
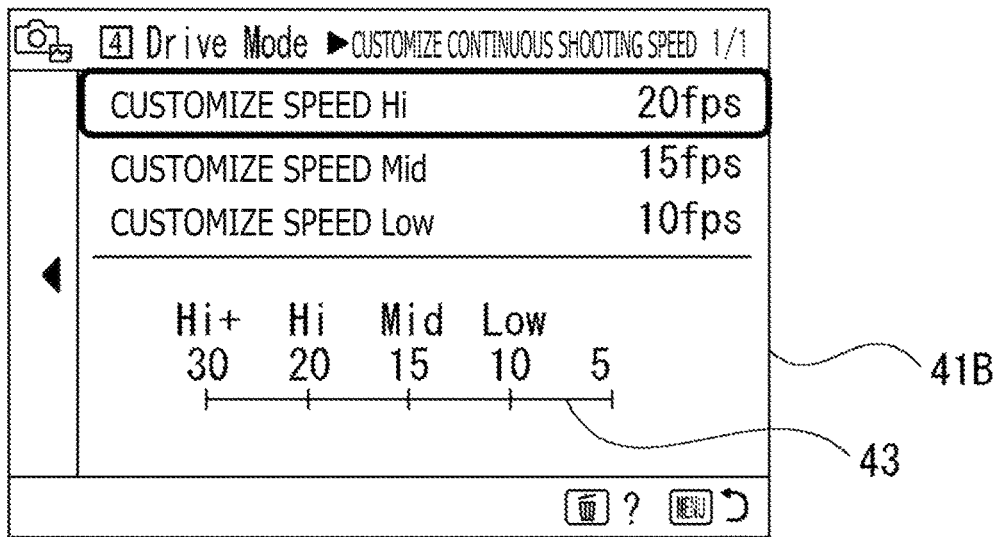
41B
43
F I G . 1 5
ELECTRONIC SHUTTER CONTINUOUS SHOOTING SPEED: Hi
- ◉ 20 images/sec
- ○ 19 images/sec
- ○ 18 images/sec
- ○ 17 images/sec
- ○ 16 images/sec
- ○ 15 images/sec
42A

IMAGING APPARATUS, IMAGING CONTROL METHOD, AND PROGRAM

TECHNICAL FIELD

The present technology relates to an imaging apparatus, an imaging control method, and a program and particularly to a technology for continuous shooting speed setting for continuous imaging.

BACKGROUND ART

There is an imaging apparatus (camera) which allows, in addition to single imaging which records one still image in response to a release operation, what is generally called continuous imaging which continuously images and records multiple still images, for example, in a period in which a shutter button is pressed.

PTL 1 discloses a digital camera in which three modes, which are high speed, middle speed, and low speed, are prepared as continuous shooting modes, and a user can optionally select one mode.

CITATION LIST

Patent Literature

[PTL 1]
Japanese Patent Laid-open No. 2008-244899

SUMMARY

Technical Problem

Incidentally, when there is considered a case in which multiple continuous shooting modes different from one another in continuous shooting speed are provided for the continuous imaging, a user can easily carry out the continuous shooing having a continuous shooting speed matching a use case by switching among the multiple continuous shooting modes, which is convenient. When the continuous shooting modes, which are high speed, medium speed, and low speed continuous shooting modes, can be selected as described in PTL 1, the continuous shooting matching a situation or a purpose of shooting is facilitated.

However, a situation and a subject of an actual shooting are various, and there exists such a request that the continuous shooting speed is more flexibly selected. In the technology of PTL 1, the continuous shooting speed can be switched among the three types of continuous shooting speeds by the mode switching, but the user cannot flexibly set the continuous shooting speed in each mode according to preference of the user or the situation.

Accordingly, the present disclosure proposes a configuration which allows more flexible setting of a frame rate such as a continuous shooting speed which a user can switch by selecting a mode.

Solution to Problem

An imaging apparatus according to the present technology includes a control section configured to provide, for all or some of multiple frame rate modes, options for a frame rate same as options in another frame rate mode and carry out frame rate setting from the multiple options in each of the multiple frame rate modes according to an operation.

For example, there are provided multiple frame rate modes such that a user can select a frame rate as a continuous shooting speed. In this case, there is provided such a configuration that the user can set a frame rate in all or some of the frame rate modes.

The frame rate may be a frame rate for motion image capturing or a frame rate for a live view image.

In the imaging apparatus according to the present technology described above, it is conceivable that the multiple frame rate modes each having the selectable frame rate have the options same as one another.

In a case in which the frame rate is selectable in, for example, three frame rate modes, the same options are applied to the three frame rate modes.

In the imaging apparatus according to the present technology described above, it is conceivable that the control section causes a presentation section to present a relative high-low relation among the respective frame rates in the multiple frame rate modes each having the selectable frame rate.

For example, for three frame rate modes, there are provided such indications, e.g., "Hi," "Mid," and "Lo," that the highs and lows of the frame rate are presented to the user.

In the imaging apparatus according to the present technology described above, it is conceivable that the control section causes presentation of a relative high-low relation among the respective frame rates in the multiple frame rate modes each having the selectable frame rate, and allows variable setting of the frame rate in each frame rate mode within a range in which a relative relation among the frame rates set to the respective frame rate modes is not inverted with respect to the presented relative high-low relation.

For example, in a case in which such indications, e.g., "Hi," "Mid," and "Lo," that the highs and lows of the frame rate are presented to the user are provided in three frame rate modes, setting is performed such that such selection that the frame rate in the frame rate mode "Mid" is higher than that in the frame rate mode "Hi" is not allowed.

In the imaging apparatus according to the present technology described above, it is conceivable that, on a setting screen for the frame rate in one frame rate mode, the control section carries out control of causing a frame rate determined as non-selectable in the one frame rate mode to be set to be displayed in a non-selectable state.

That is, when the options for the frame rate in one frame rate mode are displayed to the user, the control section determines a selectable option according to the setting in another frame rate mode that is next to the one frame rate mode in the high-low relation of frame rates.

In the imaging apparatus according to the present technology described above, it is conceivable that, on the setting screen for the frame rate in the one frame rate mode, the control section carries out control of causing a frame rate determined as non-selectable in the one frame rate mode to be set to be displayed in a non-selectable state.

For example, the non-selectable frame rate of the options is displayed in a gray-out state.

In the imaging apparatus according to the present technology described above, it is conceivable that the control section carries out processing of resetting settings of the frame rates in the multiple frame rate modes each having the selectable frame rate, to an initial state in response to a setting initialization operation.

That is, an initialization operation by the user is allowed for the frame rate modes.

In the imaging apparatus according to the present technology described above, it is conceivable that the control section carries out control of causing a current set value of the frame rate in each frame rate mode to be displayed on a setting screen for the frame rate in one frame rate mode.

For example, setting is performed such that the current frame rate setting in each frame rate mode can be recognized on the setting screen which is displayed when the user selects the frame rate.

In the imaging apparatus according to the present technology described above, it is conceivable that the control section carries out control of causing a value indicating the number of still images to be recorded per unit time to be presented as an option for the frame rate.

The frame rate is displayed, for example, in a display form of an fps (frame per second), in a display form of the number of still images per second, or the like on a setting screen for the user to variably set the frame rate.

In the imaging apparatus according to the present technology described above, it is conceivable that the control section carries out control of allowing selection of the frame rate by an operation of specifying the number of still images to be recorded per unit time.

For example, there is provided such a user interface that the user can specify the number of still images to be recorded per second.

In the imaging apparatus according to the present technology described above, it is conceivable that the control section carries out control of allowing selection of the frame rate by an operation of specifying the number of still images to be recorded per unit time, with use of a cursor on a gauge.

For example, there is provided such a user interface that the user can specify on a gauge the number of still images to be recorded per second.

In the imaging apparatus according to the present technology described above, it is conceivable that the control section carries out control of performing display that allows the frame rate setting in the multiple frame rate modes to be carried out within one screen.

For example, gauges or the like allowing variable setting of the frame rates in the multiple frame rate modes are displayed within one screen.

In the imaging apparatus according to the present technology described above, it is conceivable that the imaging apparatus further includes an operation element configured to make a selection from imaging operation modes including the multiple frame rate modes and a single shooting mode.

That is, there is provided such a configuration that switching can be carried out among a single shooting mode for recording one still image and multiple frame rates (for example, continuous shooting modes), with use of the same operation element.

In the imaging apparatus according to the present technology described above, it is conceivable that, as some of the multiple frame rate modes, a frame rate mode is provided in which a frame rate that is unable to be set in the multiple frame rate modes each having the selectable frame rate is fixedly set.

For example, one frame rate mode is set as a mode fixed to a high frame rate which cannot be set in other frame rate modes each having the variable frame rate.

In the configuration of the imaging apparatus described above, it is conceivable that the multiple frame rate modes are multiple continuous shooting modes, and a selectable frame rate is a frame rate corresponding to a continuous shooting speed.

An imaging control method according to the present technology is an imaging control method executed by an imaging control apparatus, including providing, for all or some of multiple frame rate modes, options for a frame rate same as options in another frame rate mode, and carrying out control to perform frame rate setting from the multiple options in each of the multiple frame rate modes according to an operation.

With this method, the frame rate in each of the multiple frame rate modes is variably set.

A program according to the present technology is a program for causing an arithmetic operation processing apparatus to carry out the control described above. This program enables easy implementation of the imaging apparatus according to the present disclosure.

BRIEF DESCRIPTION OF DRAWINGS

FIG. 4 is a block diagram of an internal configuration of the imaging apparatus according to the embodiments.

FIG. 6 depicts explanatory diagrams of setting screens for the continuous shooting speed according to the embodiments.

FIG. 7 is a flowchart of a setting processing example according to the first embodiment.

FIG. 8 is an explanatory diagram of options for the continuous shooting speed in an H mode in the second embodiment.

FIG. 9 is an explanatory diagram of options for the continuous shooting speed in an L mode in the second embodiment.

FIG. 10 is an explanatory diagram of options for the continuous shooting speed in an M mode in the second embodiment.

FIG. 13 is a flowchart of a setting processing example according to the third embodiment.

FIG. 14 is an explanatory diagram of an example in which current set values are displayed on a setting screen according to the embodiments.

FIG. 15 is an explanatory diagram of an example in which the number of still images is specified on a setting screen according to the embodiments.

DESCRIPTION OF EMBODIMENTS

Hereinafter, embodiments are described in the following order.

<1. Configuration of Imaging Apparatus>
<2. First Embodiment>
<3. Second Embodiment>
<4. Third Embodiment>
<5. UI Examples>
<6. Summary and Modification Examples>

Note that meanings of some terms used in the present disclosure are now described.

"Imaging" refers to an operation of exposing an imaging element (image sensor) and reading out a signal (image signal) of exposed pixels. The image signal acquired by the imaging is subjected to signal processing one frame by one frame, resulting in image data forming a still image.

"Imaging and recording" refer to an operation of capturing a still image in response to a release operation of a user and the like, and recording the captured still image in a recording medium. For example, the imaging and recording of a still image are carried out in response to an operation of what is generally called continuous imaging or single imaging.

"Single imaging" is an operation of imaging and recording one still image in response to a release operation (for example, shutter operation).

"Continuous imaging" is an operation of imaging and recording multiple still images during a release operation (while a shutter button is being pressed and held).

"Continuous shooting speed" in the continuous imaging is a speed corresponding to the number of still images imaged and recorded per unit time. Hence, the continuous shooting speed can be represented by an indication such as "fps" or "10 images/sec."

"Imaging operation mode" is a generic name of modes including "single shooting mode" and multiple "continuous shooting modes."

"Single shooting mode" is a mode in which the single imaging described above is carried out.

"Continuous shooting mode" is a mode in which the continuous imaging described above is carried out. In the embodiments, as this continuous shooting mode, there are provided multiple continuous shooting modes different in continuous shooting speed. As these multiple continuous shooting modes, as an example, a description is given of an example in which "H+ mode," "H mode," "M mode," and "L mode" are provided.

"H+ mode" is an abbreviation of "High+ mode" and means a super high-speed mode.

"H mode" is an abbreviation of "High mode" and means a high-speed mode.

"M mode" is an abbreviation of "Middle mode" and means a middle-speed mode.

"L mode" is an abbreviation of "Low mode" and means a low-speed mode.

Moreover, in embodiments, as multiple frame rate modes, multiple "continuous shooting modes" are assumed. For example, each of "H+ mode," "H mode," "M mode," and "L mode" is an example of frame rate mode.

In this case, a frame rate set in each frame rate mode is a frame rate as the continuous shooting speed described above.

1. CONFIGURATION OF IMAGING APPARATUS

Figure 1:
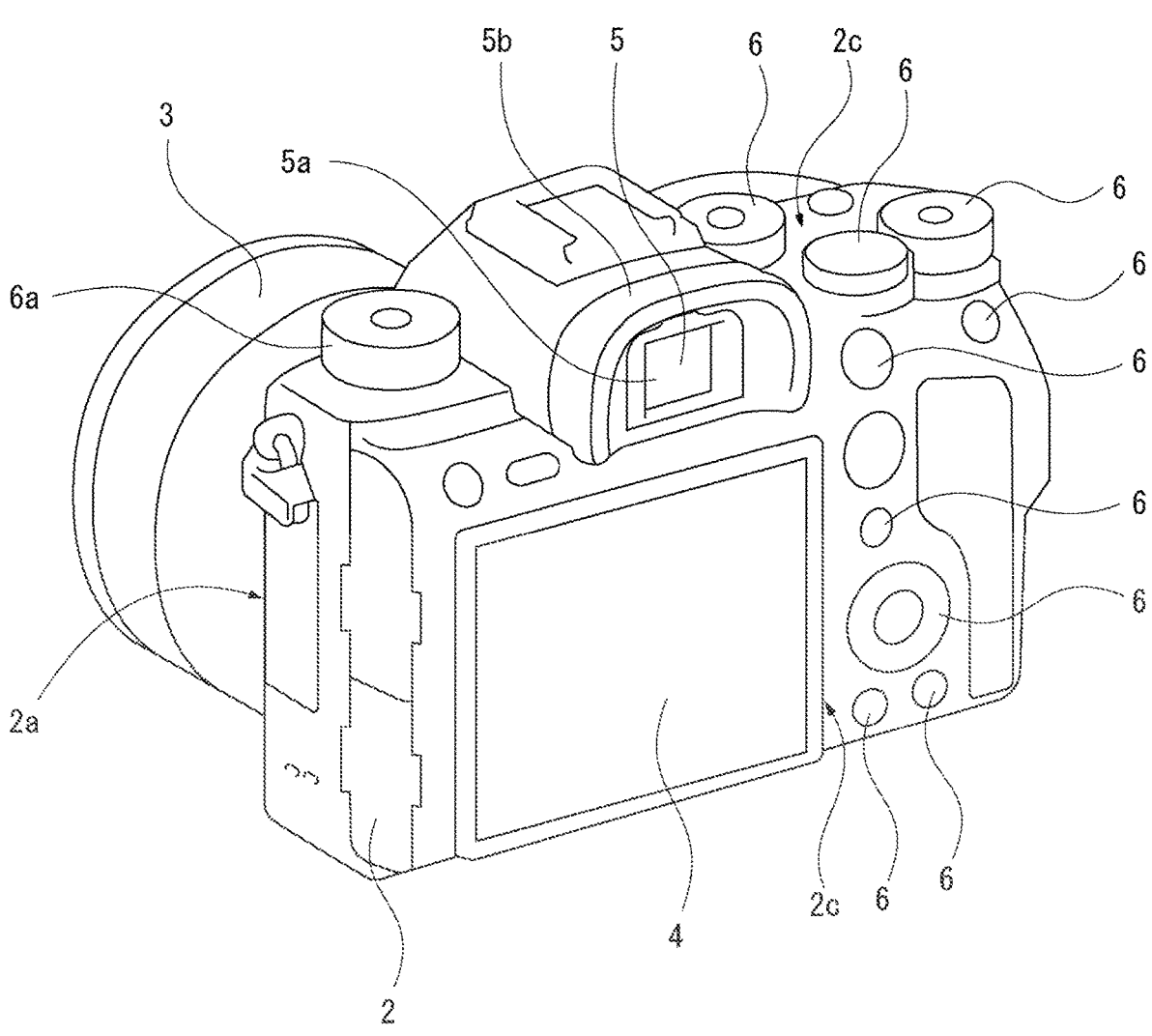
FIG. 1 is a perspective view of an imaging apparatus according to embodiments of the present technology.
Figures 2, 3:
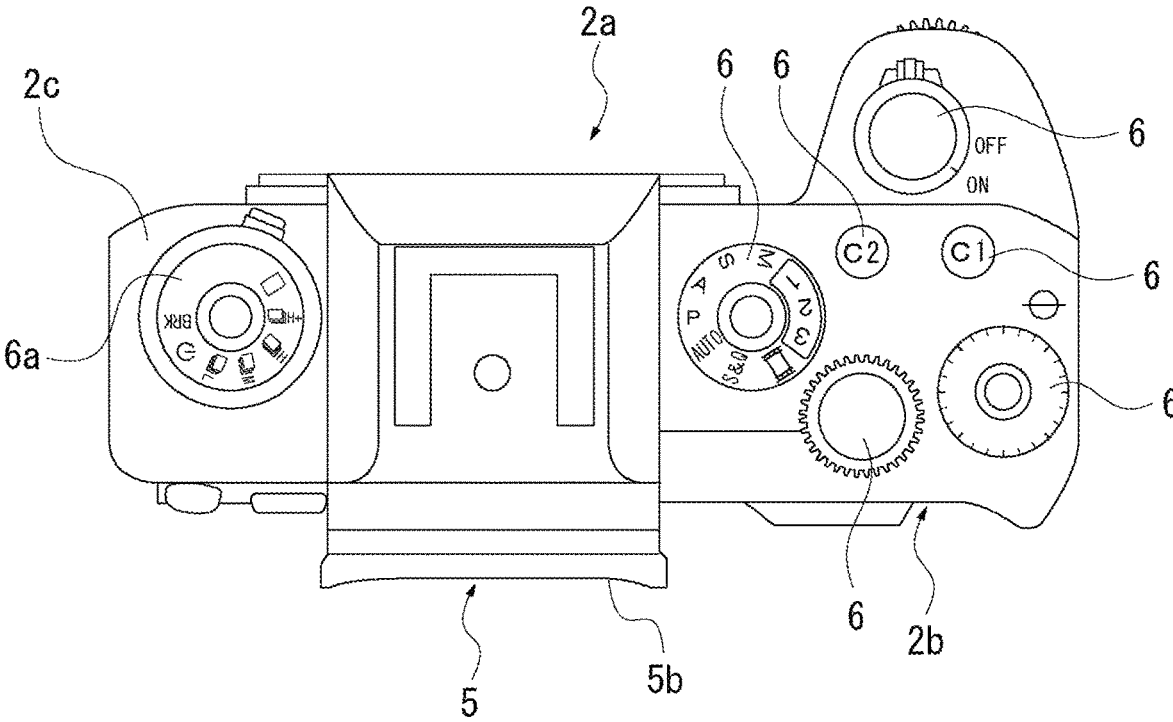
FIG. 2 is a plan view of the imaging apparatus according to the embodiments.
FIG. 3 is an explanatory diagram of imaging operation modes of the imaging apparatus according to the embodiments.

An exterior of an imaging apparatus 1 according to the embodiments is illustrated in FIG. 1 and FIG. 2.

Note that a description is given while it is assumed that a subject side is a front side and an imaging person side is a rear side.

The imaging apparatus 1 includes a camera housing 2 inside and outside which each required section is arranged, and a lens barrel 3 which is detachable from the camera housing 2 and is attached to a front surface portion 2a as illustrated in FIG. 1 and FIG. 2. FIG. 2 illustrates the camera housing 2 from which the lens barrel has been detached.

Note that such a configuration that the lens barrel 3 is detachable as what is generally called an interchangeable lens is an example, and the lens barrel 3 may be a lens barrel which is non-detachable from the camera housing 2.

A rear monitor 4 is arranged on a rear surface portion 2b of the camera housing 2. On the rear monitor 4, a live view image, a reproduced image of a recorded image, and the like are displayed.

The rear monitor 4 includes a display device, for example, a liquid crystal display (LCD), an organic EL (Electro-Luminescence) display, or the like.

The rear monitor 4 is rotatable with respect to the camera housing 2. For example, the rear monitor 4 is rotatable in such a manner that a bottom end portion of the rear monitor 4 moves backward about a top end portion of the rear monitor 4 as a rotation shaft. Note that a right end portion or a left end portion of the rear monitor 4 may be configured as a rotation shaft. Further, the rear monitor 4 may be capable of rotating about multiple axes.

An EVF (Electric Viewfinder) 5 is arranged on an upper surface portion 2c of the camera housing 2. The EVF 5 includes an EVF monitor 5a, and a surrounding portion 5b in a frame form protruding backward in such a manner as to surround an upper side and left and right sides of the EVF monitor 5a.

The EVF monitor 5a includes an LCD, an organic EL display, or the like. Note that there may be provided an optical view finder (OVF) in place of the EVF monitor 5a.

Various operation elements 6 are provided on the rear surface portion 2b and the upper surface portion 2c. For example, the operation elements 6 are a shutter button (release button), a reproduction menu activation button, a determination button, a cross key, a cancel button, a zoom key, a slide key, and the like.

These operation elements 6 include operation elements in various forms such as a button, a dial, and a complex operation element which can be pressed and rotated. For example, a shutter operation, a menu operation, a reproduction operation, a mode selection/switching operation, a focus operation, a zoom operation, and selection/setting of parameters such as a shutter speed and an F-number can be implemented by the operation elements 6 in the various forms.

As one of these operation elements 6, there is provided a dial 6a for mode selection which allows the user to select the imaging operation mode.

The imaging operation modes selectable by the dial 6a are illustrated in FIG. 3.

As illustrated, as the imaging operation modes, a single shooting mode, continuous shooting modes, a delayed-action mode, and a bracket mode are prepared.

In this case, as the continuous shooting modes, four continuous shooting modes different in continuous shooting speed are prepared. That is, these four continuous shooting modes are "H+ mode," "H mode," "M mode," and "L mode" described before.

In the embodiments, while the continuous shooting speed is fixed in the "H+ mode," the continuous shooting speed is variably set in response to a user operation in the "H mode," the "M mode," and the "L mode."

An internal configuration of such an imaging apparatus 1 is illustrated in FIG. 3.

In the imaging apparatus 1, light from the subject is incident, via an imaging optical system 11, on an imaging element 12 including a CMOS (Complementary Metal Oxide Semiconductor) sensor, a CCD (Charge Coupled Device) sensor, or the like and is subjected to photoelectric conversion in the imaging element 12, and an analog image signal is acquired from the imaging element 12.

In the imaging optical system 11 are provided various lenses such as a zoom lens, a focus lens, and a condenser lens, a diaphragm mechanism, a drive mechanism for the zoom lens, and a drive mechanism for the focus lens. There is a case in which a mechanical shutter (for example, focal plane shutter) is provided.

The imaging element 12 is formed by arranging, in a two-dimensional shape on a CMOS substrate, for example, multiple pixels each including a photodiode (photo gate), a transfer gate (shutter transistor), a switching transistor (address transistor), an amplification transistor, and a reset transistor (reset gate). In the imaging element 12, a vertical scan circuit, a horizontal scan circuit, and an image signal output circuit are formed.

The imaging element 12 may be any of the primary color system and the complementary color system. The analog image signals acquired from the imaging element 12 are primary color signals in respective colors of R, G, and B or color signals of the complementary color system. Moreover, the imaging element 12 may have a configuration without a color filter, and the analog image signals acquired from the imaging element 12 may be black/white image signals.

Each color signal of the analog image signals from the imaging element 12 is sampled and held in an analog signal processing section 13 configured as an IC (Integrated Circuit), is adjusted in amplitude through AGC (Automatic Gain Control), and is converted to a digital image signal through A/D (Analog to Digital) conversion.

The digital image signal (hereinafter, image data) from the analog signal processing section 13 is input to a temporary storage section 26.

Note that there is a case in which the imaging element 12 and the analog signal processing section 13, or further the temporary storage section 26 in addition thereto, are integrated. Moreover, frame memories described below as the temporary storage section 26 may be provided in a stacked imaging element.

The temporary storage section 26 includes two frame memories 26A and 26B in this example.

The image data from the analog signal processing section 13 is alternately stored in the frame memory 26A and the frame memory 26B. That is, the temporary storage section 26 stores two image frames continuously captured. The image data stored in the temporary storage section 26 is sequentially output from the frame which has first been stored to a digital signal processing section 20. That is, the image data is sequentially output, to the digital signal processing section 20, alternately according to the imaging order from the frame memory 26A and the frame memory 26B.

As described above, for example, the live view images can continuously be displayed without blackout even during the continuous imaging by providing the frame memories 26A and 26B.

The digital signal processing section 20 includes, for example, a DSP (Digital Signal Processor) or the like as an image processing processor. The digital signal processing section 20 applies various types of signal processing to the input image data. The digital signal processing section 20 carries out, for example, as camera processes, preprocessing, synchronization processing, YC generation processing, and the like.

Moreover, the digital signal processing section 20 carries out, for example, compression encoding, formatting, generation and addition of metadata, and the like for recording or communication as file formation processing for the image data to which the various types of processing have been applied, to thereby generate a file for recording or communication. For example, the digital signal processing section 20 generates, as a still image file, an image file in a format such as the JPEG, the TIFF (Tagged Image File Format), the GIF (Graphics Interchange Format), or the like. Moreover, it is conceivable to generate an image file in the MP4 format used to record a motion image and sound compliant to the MPEG-4 or the like.

Note that it is also conceivable to generate an image file as RAW image data.

Moreover, the digital signal processing section 20 carries out resolution conversion processing for the image data to which the various types of signal processing have been applied, to thereby generate, for example, image data reduced in resolution for the live view display.

A memory section 27 indicates a buffer memory for the image data. The memory section 27 includes, for example, a D-RAM (Dynamic Random Access Memory).

The image data processed by the digital signal processing section 20 is temporarily stored in the memory section 27 and is transferred to a display section 15, a recording control section 14, or a communication section 16 at a predetermined timing.

The recording control section 14 carries out, for example, recording in and reproduction from a recording medium including a nonvolatile memory. The recording control section 14 carries out, for example, processing of recording an image file such as motion image data and still image data in the recording medium.

Various actual forms of the recording control section 14 are conceivable. For example, the recording control section 14 may include a flash memory built in the imaging apparatus 1 and a writing/reading circuit therefor. Moreover, the recording control section 14 may be in a form of a card recording and reproduction section which makes a recording and reproduction access to a recording medium detachable from the imaging apparatus 1, for example, a memory card (portable flash memory or the like). Moreover, the recording control section 14 is implemented as an HDD (Hard Disk Drive) or the like as a form built in the imaging apparatus 1.

The display section 15 is a display section which carries out various types of display to the imaging person, and is, for example, the rear monitor 4 and the EVF 5 arranged on the housing of the imaging apparatus 1 as illustrated in FIG. 1.

The display section 15 causes various types of display to be carried out on a display screen on the basis of an instruction of the camera control section 21.

For example, the display section 15 causes a reproduced image of the image data read out from the recording medium in the recording control section 14 to be displayed.

Moreover, the image data of the captured image to which the resolution conversion has been applied for display by the digital signal processing section 20 is supplied to the display section 15, and display corresponding thereto, for example, the display of the live view image is carried out.

Moreover, the display section 15 causes display as various operation menus, icons, messages, and the like, that is, as a GUI (Graphic User Interface), to be carried out on the screen on the basis the instruction of the camera control section 21.

The communication section 16 carries out data communication and network communication to and from external apparatuses in a wired form or a wireless form.

For example, the communication section 16 transmits and outputs the image data (a still image file and a motion image file) and the meta data to an external information processing apparatus, an external display apparatus, an external recording apparatus, an external reproduction apparatus, and the like.

Moreover, the communication section 16 carries out, as a network communication section, various types of network communication such as that via the Internet, a home network, and a LAN (Local Area Network), to thereby be capable of carrying out transmission and reception of various types of data to and from a server, a terminal, and the like on a network.

An operation section 17 collectively represents input devices for the user to carry out various types of operation input. Specifically, the operation section 17 represents a key, a dial, and the like as the various types of operation elements 6 (including the dial 6a) provided to the housing of the imaging apparatus 1. Moreover, the operation elements 6 corresponding to the operation section 17 also include, for example, a touch panel or a touch pad provided to the rear monitor 4. Further, the operation section 17 may be configured as a reception section for an operation signal from a remote controller.

The operation of the user is detected by the operation section 17, and a signal corresponding to the input operation is transmitted to the camera control section 21.

The camera control section 21 includes a microcomputer (arithmetic operation processing apparatus) provided with a CPU (Central Processing Unit). The camera control section 21 is an imaging control apparatus for controlling the operation of the imaging apparatus 1.

A memory section 19 stores information and the like used by the camera control section 21 for processing. The illustrated memory section 19 comprehensively represents, for example, a ROM (Read Only Memory), a RAM (Random Access Memory), a flash memory, and the like.

The memory section 19 may be a memory area built in a microcomputer chip used as the camera control section 21 or may include a separate memory chip.

The camera control section 21 executes a program stored in a ROM, a flash memory, or the like of the memory section 19 to thereby control the entire imaging apparatus 1.

For example, the camera control section 21 carries out control such as instruction for the various types of signal processing in the digital signal processing section 20, the imaging operation and the recording operation in response to the operations of the user, and the reproduction operation of the recorded image files.

Moreover, the camera control section 21 carries out, as automatic exposure control, operation control for the diaphragm mechanism, control for the shutter speed of the imaging element 12, AGC gain control in the analog signal processing section 13.

Moreover, the camera control section 21 carries out drive control for the focus lens and the zoom lens in response to auto focus control, a manual focus operation, a zoom operation, and the like.

Moreover, the camera control section 21 controls the shutter speed, an exposure timing, and the like in the imaging element 12.

The camera control section 21 is provided with functions as a setting control section 24 which carries out control processing relating to continuous shooting speed setting in the continuous shooting mode.

The setting control section 24 carries out display control for a setting screen for continuous shooting speed setting operation by the display section 15 and processing of detecting the operation input of the user by the operation section 17, that is, carries out UI (user interface) processing.

Moreover, the setting control section 24 carries out, on the basis of the UI processing, processing of variably setting the continuous shooting speed in each continuous shooting mode ("H mode," "M mode," or "L mode").

The camera control section 21 controls, on the basis of such continuous shooting speed settings, the imaging and recording operation in the continuous shooting mode. That is, in a case in which any of "H+ mode," "H mode," "M mode," or "L mode" is specified by the dial 6a, the camera control section 21 controls the imaging operation of the imaging element 12 and the signal processing in the digital signal processing section 20 in such a manner that imaging and recording for still images corresponding to the specified continuous shooting mode is carried out.

The RAM in the memory section 19 is used, as a work area for various types of data processing by the CPU of the camera control section 21, to temporarily store data, programs, and the like.

The ROM and the flash memory (nonvolatile memory) in the memory section 19 are used to store an OS (Operating System) for controlling, by the CPU, respective sections, application programs for various operations, firmware, various types of setting information, and the like.

As the various types of setting information, there are communication setting information, setting information relating to the imaging operation, setting information relating to the image processing, and the like. As the setting information relating to the imaging operation, there are an exposure setting, a shutter speed setting, a curtain speed setting for the mechanical shutter or the electronic shutter, a mode setting, and the like.

As one piece of information relating to the mode setting, there is stored a current set value of the continuous shooting speed in each of the continuous shooting modes (the H+ mode, the H mode, the M mode, and the L mode). Moreover, there is a case in which initial set values are stored in, for example, a nonvolatile memory area.

In a driver section 22 are provided, for example, a motor driver for a zoom lens drive motor, a motor driver for a focus lens drive motor, a motor driver for a motor of the diaphragm mechanism, and the like.

These motor drivers apply drive currents to corresponding drivers according to instructions from the camera control section 21, to thereby cause movements of the focus lens and the zoom lens, opening and closing of diaphragm blades of the diaphragm mechanism, and the like to be carried out.

Description is now given of blackout-free processing in the continuous imaging.

In a state before the release operation for the still image recording, and upon the release operation, the live view display is carried out, and there exists such a phenomenon (blackout) that the display of the live view image is disrupted at a timing after the release. Processing of preventing the live view image from blacking out and being disrupted is the blackout-free processing.

The blackout is described in an example of the continuous imaging.

For example, during the continuous imaging, capture exposure for still image imaging and recording is repeated at a predetermined cycle. In a case in which this cycle for the capture exposure is longer than one frame cycle defined by the frame rate of the live view image, one or multiple times of inter-frame exposure is carried out between the capture exposure and the capture expose. For example, such an exposure operation as "capture exposure," "inter-frame exposure," "inter-frame exposure," "capture exposure," "inter-frame exposure," "inter-frame exposure," . . . is repeated until an end of the continuous shooting.

When the release operation is carried out during the exposure for the live view image, the camera control section 21 causes the imaging element 12 to disrupt the exposure for the live view image and instructs the imaging element 12 to start the continuous imaging. For example, the camera control section 21 gives an instruction to change, for example, a read pixel, a resolution, and the like for the capture exposure. After that, the camera control section 21 causes the capture exposure of the imaging element 12 to start after preparation for the capture exposure is completed.

In such a flow of operation, as a result of the disruption of the ongoing exposure for the live view image at the timing of the release operation, the live view image in a corresponding frame cannot be displayed, resulting in occurrence of the blackout. The blackout continues until the capture exposure is carried out and the frame of the live view image based on the capture exposure is displayed.

As one method for preventing such blackout, there is a method of avoiding the disruption of the ongoing exposure for the live view image at the release operation timing. That is, the ongoing exposure for the live view image is not disrupted at the release operation timing and is completed, and thereafter, the image data is stored in, for example, the frame memory 26A, to thereby enable the display of the live view image in this frame.

After the exposure for the live view image is completed, the capture exposure is prepared, and the capture exposure is carried out after the preparation. In this regard, the image data obtained as a result of the capture exposure is caused to be stored in the frame memory 26B. As a result, during a period until the live view image data based on the image data obtained as a result of the capture exposure is generated, the display of the live view image can be continued by using the image data in the frame memory 26A. With this configuration, the blackout does not occur.

There is another method for preventing the blackout. For example, when the release operation is carried out while the live view image is being written to the frame memory 26B after the exposure has been carried out for the live view image, this exposure is disrupted, and the newest image which has already been stored in the frame memory 26A (for example, the image data in a frame immediately before the frame the exposure of which is disrupted) is copied to the frame memory 26B. After that, the display of the live view image is continued by using the image from the frame memory 26B. At this time, the image data obtained as a result of the capture exposure is written to the frame memory 26A, and after the capture exposure is completed, a live view image based on the image data obtained as a result of the capture exposure is displayed.

It is possible to avoid, by using the frame memories 26A and 26B as described above, the disruption of the live view image upon the release operation.

Particularly, during the continuous shooting, it is expected that a cameraman causes the continuous imaging to be continued while at the same time watching the live view image and following the subject, and it is therefore extremely useful to avoid the disruption of the live view image by the blackout-free processing.

2. FIRST EMBODIMENT

A description is now given of the variable setting in the continuous shooting mode as the first embodiment.

In the imaging apparatus 1, "H+ mode," "H mode," "M mode," and "L mode" are prepared as the continuous shooting modes as described before. In this case, the H+ mode has a fixed continuous shooting speed, and the H mode, the M mode, and the L mode have variable continuous shooting speeds.

Figure 5:
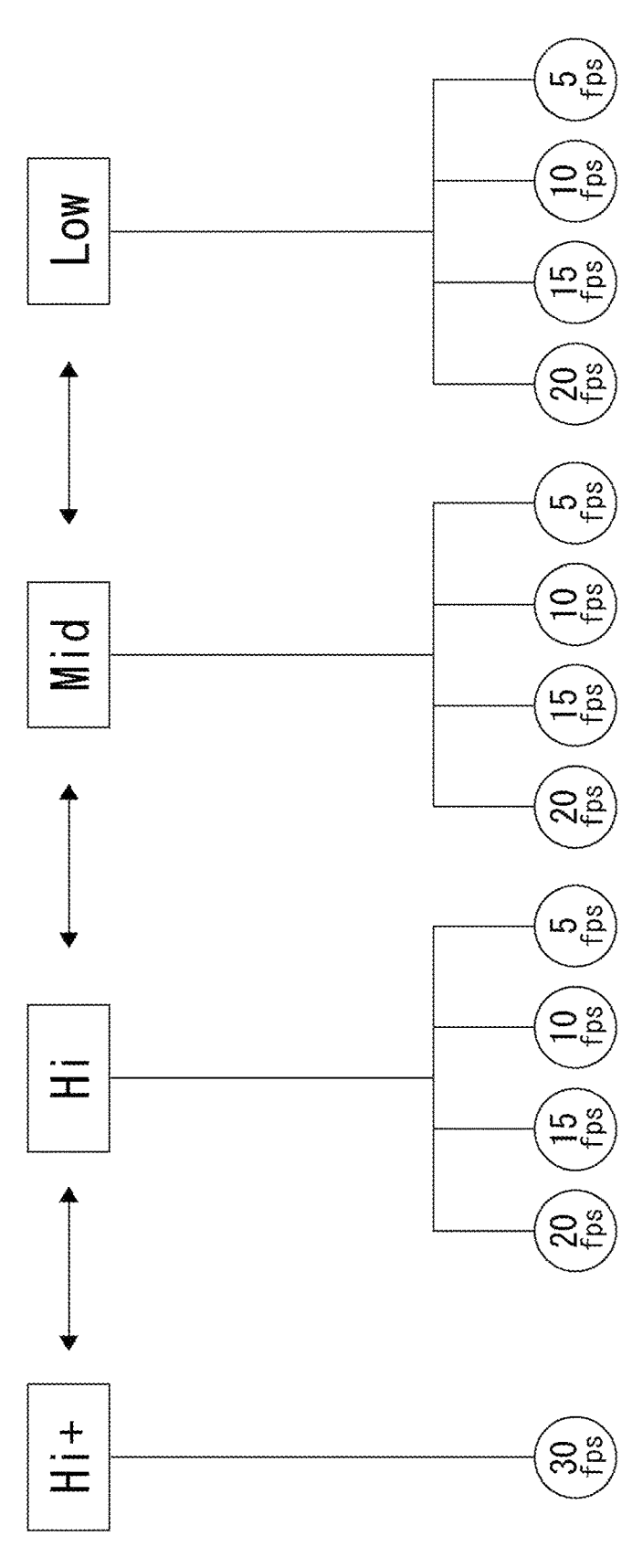
FIG. 5 is an explanatory diagram of options for a continuous shooting speed in each continuous shooting mode in a first embodiment.

FIG. 5 illustrates a setting example of each of such continuous shooting modes. Note that "Hi+," "Hi," "Mid," and "Low" mean the H+ mode, the H mode, the M mode, and the L mode, respectively, in each drawing.

The H+ mode is a mode in which the continuous shooting speed is fixed to, for example, 30 fps.

In the H mode, the continuous shooting speed can be selected from four options which are 20 fps, 15 fps, 10 fps, and 5 fps.

Similarly, also in each of the M mode and the L mode, the continuous shooting speed can be selected from the four options which are 20 fps, 15 fps, 10 fps, and 5 fps.

That is, it is assumed that the user can optionally select and set the continuous shooting speed to be assigned, from the same four options in each of the H mode, the M mode, and the L mode.

For example, there can be made a setting which follows a high-low relation among the continuous shooting speeds in the H mode, the M mode, and the L mode as described below.

20 fps in H mode, 15 fps in M mode, and 10 fps in L mode
15 fps in H mode, 10 fps in M mode, and 5 fps in L mode
20 fps in H mode, 10 fps in M mode, and 5 fps in L mode
20 fps in H mode, 15 fps in M mode, and 5 fps in L mode Moreover, for example, there can be made such a setting that the high-low relation among the continuous shooting speeds in the H mode, the M mode, and the L mode is inverted as described below.

10 fps in H mode, 15 fps in M mode, and 20 fps in L mode
5 fps in H mode, 10 fps in M mode, and 15 fps in L mode
5 fps in H mode, 10 fps in M mode, and 20 fps in L mode
5 fps in H mode, 15 fps in M mode, and 20 fps in L mode Further, there can be made such a setting that all of the three continuous shooting speeds in the H mode, the M mode, and the L mode are the same as described below.

20 fps in H mode, 20 fps in M mode, and 20 fps in L mode
15 fps in H mode, 15 fps in M mode, and 15 fps in L mode
10 fps in H mode, 10 fps in M mode, and 10 fps in L mode
5 fps in H mode, 5 fps in M mode, and 5 fps in L mode Still further, there can be made such a setting that two of the continuous shooting speeds in the H mode, the M mode, and the L mode are the same as described below.

20 fps in H mode, 20 fps in M mode, and 15 fps in L mode
20 fps in H mode, 20 fps in M mode, and 10 fps in L mode
20 fps in H mode, 20 fps in M mode, and 5 fps in L mode
20 fps in H mode, 5 fps in M mode, and 5 fps in L mode
15 fps in H mode, 5 fps in M mode, and 5 fps in L mode
10 fps in H mode, 5 fps in M mode, and 5 fps in L mode There are expected more patterns for the combination in which two continuous shooting speeds are the same.

As described above, the user can customize the H mode, the M mode, and the L mode according to own preference and the use case by allowing the user to freely and variably set the continuous shooting speeds in the H mode, the M mode, and the L mode.

FIG. 6 illustrates an example of a user interface for carrying out such settings. For example, FIG. 6 illustrates screen examples displayed on the display section 15.

FIG. 6A illustrates a drive mode screen 30 which is set to a certain layer in a menu. An item "Customize Continuous Shooting Speed" is prepared in the drive mode screen 30.

When the user selects "Customize Continuous Shooting Speed" by a cursor operation or the like, the screen display proceeds to a continuous shooting mode selection screen 41 of FIG. 6B.

On the continuous shooting mode selection screen 41 are displayed items "Customize Speed Hi," "Customize Speed Mid," and "Customize Speed Low." These are items for allowing the user to select which of each of the H mode, the M mode, and the L mode is to be customized.

For example, when the user carries out an operation for selecting "Customize Speed Hi," the screen display proceeds to a speed selection screen 42 for the H mode as illustrated in FIG. 6C.

On the speed selection screen 42, there are displayed options "20 fps," "15 fps," "10 fps," and "5 fps" for the continuous shooting speed in the H mode. The user can select any continuous shooting speed.

Note that, when the user carries out an operation for selecting "Customize Speed Mid" on the continuous shooting mode selection screen 41 of FIG. 6B, the screen display proceeds to the speed selection screen 42 for the M mode having similar options to those of FIG. 6C, which is not illustrated.

Moreover, when the user carries out an operation for selecting "Customize Speed Low" on the continuous shooting mode selection screen 41 of FIG. 6B, the screen display proceeds to the speed selection screen 42 for the L mode having similar options to those of FIG. 6C.

Accordingly, the user interface for allowing the selection of the continuous shooting speed from the four options illustrated in FIG. 5 is provided for each of the H mode, the M mode, and the L mode.

As described above, the continuous shooting mode selection screen 41 and the speed selection screen 42 are prepared as setting screens 40 for the continuous shooting speed setting, and hence, the user can carry out the selection operation.

The operation for item selection on these screens may be carried out by a cursor operation using the cross key or the like as the operation element 6, or may be carried out through a touch operation using a touch panel, a touch pad, or the like.

FIG. 7 illustrates a processing example by the camera control section 21 in response to the operation using such setting screens 40 (continuous shooting mode selection screen 41 and the speed selection screen 42).

This is a processing example by the function of the setting control section 24 in the camera control section 21.

FIG. 7 illustrates, as Step S100, processing from the state in which the drive mode screen 30 of FIG. 6A is displayed.

When "Customize Continuous Shooting Speed" is selected on the drive mode screen 30, the camera control section 21 proceeds from Step S101 to Step S102 and carries out processing of causing the display section 15 to display the continuous shooting mode selection screen 41.

The camera control section 21 monitors the user operation in Steps S103, S104, S105, and S106 during the display of the continuous shooting mode selection screen 41. That is, the camera control section 21 detects absence/presence of each of operations "Customize Speed Hi," "Customize Speed Mid," "Customize Speed Low," and "Return."

In a case in which the camera control section 21 detects the operation of "Return," the camera control section 21 proceeds from Step S106 to Step S100 and carries out processing of returning the display to that of the drive mode screen 30.

In a case in which the camera control section 21 detects the operation of "Customize Speed Hi" on the continuous shooting mode selection screen 41, the camera control section 21 proceeds from Step S103 to Step S111, and carries out processing of causing the speed selection screen 42 for the H mode to be displayed.

In this state, the camera control section 21 may display a current setting state. For example, when the current continuous shooting speed in the H mode is 20 fps, the state in which the item "20 fps" is selected is indicated by a checkbox or highlighting as illustrated in the example of FIG. 6C.

After that, the camera control section 21 monitors a setting change operation for the continuous shooting speed in Step S112 and monitors a cancel operation in Step S113.

The user can change, by, for example, a cursor operation in an up-down direction on the speed selection screen 42 displayed in Step S111, an item in selection (an item indicated by the checkbox or the highlighting) among the items (the respective continuous shooting speeds) set as the options and can then carry out a determination operation. The determination operation described here is only required to be an operation of changing the item in selection and then returning the screen or pressing an enter key.

Such a determination operation in the state in which the item in selection (the continuous shooting speed) is changed is considered as a setting change operation. After that, when the setting change operation has been carried out, the camera control section 21 proceeds from Step S112 to Step S114 and carries out processing of changing the setting of the continuous shooting speed in the H mode to the newly selected continuous shooting speed. After that, the camera control section 21 proceeds to Step S102 and carries out processing of returning the screen to the continuous shooting mode selection screen 41.

Meanwhile, in a case in which the user does not change the continuous shooting speed in selection on the speed selection screen 42 displayed in Step S111 and carries out the operation of returning the screen, the camera control section 21 considers this operation as the cancel operation, proceeds from Step S113 to Step S102, and carries out the processing of returning the screen to the continuous shooting mode selection screen 41.

In a case in which the camera control section 21 detects the operation of "Customize Speed Mid" on the continuous shooting mode selection screen 41 in Step S102, the camera control section 21 proceeds from Step S104 to Step S121 and carries out the processing of causing the speed selection screen 42 for the M mode to be displayed.

In this state, the camera control section 21 may indicate the current set state in the M mode by, for example, the display of the checkbox or the highlighting of the item of the option.

After that, the camera control section 21 monitors the setting change operation for the continuous shooting speed in Step S122 and monitors the cancel operation in Step S123.

When the determination operation in the state in which the item in selection (the continuous shooting speed) is changed, that is, the setting change operation, is carried out, the camera control section 21 proceeds from Step S122 to Step S124 and carries out processing of changing the setting of the continuous shooting speed in the M mode to the newly selected continuous shooting speed. After that, the camera control section 21 proceeds to Step S102 and carries out the processing of returning the screen to the continuous shooting mode selection screen 41.

Moreover, in a case in which the user does not change the continuous shooting speed in selection on the speed selection screen 42 displayed in Step S121 and carries out the operation of returning the screen, the camera control section 21 considers this operation as the cancel operation, proceeds from Step S123 to Step S102, and carries out the processing of returning the screen to the continuous shooting mode selection screen 41.

In a case in which the camera control section 21 detects the operation of "Customize Speed Low" on the continuous shooting mode selection screen 41 in Step S102, the camera control section 21 proceeds from Step S105 to Step S131 and carries out the processing of causing the speed selection screen 42 for the L mode to be displayed.

In this state, the camera control section 21 may indicate the current set state in the L mode by, for example, the display of the checkbox or the highlighting of the item of the option.

After that, the camera control section 21 monitors the setting change operation for the continuous shooting speed in Step S132 and monitors the cancel operation in Step S133.

When the determination operation in the state in which the item in selection (the continuous shooting speed) is changed, that is, the setting change operation, is carried out, the camera control section 21 proceeds from Step S132 to Step S134 and carries out processing of changing the setting of the continuous shooting speed in the L mode to the newly selected continuous shooting speed. After that, the camera control section 21 proceeds to Step S102 and carries out the processing of returning the screen to the continuous shooting mode selection screen 41.

Moreover, in a case in which the user does not change the continuous shooting speed in selection on the speed selection screen 42 displayed in Step S131 and carries out the operation of returning the screen, the camera control section 21 considers this operation as the cancel operation, proceeds from Step S133 to Step S102, and carries out the processing of returning the screen to the continuous shooting mode selection screen 41.

As a result of the execution of the processing described above in the camera control section 21, the setting of the continuous shooting speed can be changed in each of the H mode, the M mode, and the L mode in response to the user operation.

3. SECOND EMBODIMENT

As a second embodiment, there is described an example in which the variable setting of the continuous shooting speed in each continuous shooting mode is allowed within such a range that the relative high-low relation among the speeds set in the respective continuous shooting modes (the H mode, the M mode, and the L mode) is not inverted with respect to the relative highs and lows of the respective continuous shooting modes presented by the dial 6a or the like.

The H mode, the M mode, and the L mode mean the high speed, the middle speed, and the low speed as described before, and hence, the relative highs and lows of the respective continuous shooting speeds are presented to the user by indicating "H," "M," and "L" on the dial 6a.

However, when the user can freely select the options for the continuous shooting speeds as in the first embodiment, there may occur such a case that the relation between the highs and lows of the continuous shooting speeds set in each continuous shooting mode and the indications of "H," "M," and "L" do not hold. Such a state does not pose a serious problem to a user who understands the customization made by the user himself or herself. However, some users may be confused about the operation by, for example, an occurrence of such a situation that the continuous shooting speed decreases even when the dial 6a is turned from "L" to "M."

It is therefore conceivable to limit the variable setting of the continuous shooting speed in each continuous shooting mode, according to the settings in other continuous shooting modes.

FIG. 8, FIG. 9, and FIG. 10 schematically illustrate states of the options upon the operation for setting the continuous shooting speed in the H mode, the L mode, and the M mode, respectively.

In this example, as the example described before, the continuous shooting speed can be selected from the four options, which are 20 fps, 15 fps, 10 fps, and 5 fps, in each continuous shooting mode in the speed selection screen 42 as that of FIG. 6B.

FIG. 8 illustrates the state of the options in the H mode in each case and the set state of the continuous shooting speed in the M mode in each case. In a case in which the speed selection screen 42 is reached for the continuous shooting speed selection in the H mode, there are expected four cases from a case H1 to a case H4 corresponding to the set states in the M mode.

The case H1 is a case in which the continuous shooting speed in the M mode is set to 20 fps. In this case, the option selectable in the H mode is only 20 fps, and 15 fps, 10 fps, and 5 fps are set as non-selectable. For example, 15 fps, 10 fps, and 5 fps are grayed out on the speed selection screen 42 of FIG. 6C.

Note that • of FIG. 8, FIG. 9, and FIG. 10 indicates that the display of the option is grayed out so that the user cannot select.

The case H2 is a case in which the continuous shooting speed in the M mode is set to 15 fps, and the selectable options in the H mode are 20 fps and 15 fsp in this case.

The case H3 is a case in which the continuous shooting speed in the M mode is set to 10 fps, and the selectable options in the H mode are 20 fps, 15 fsp, and 10 fps in this case.

The case H4 is a case in which the continuous shooting speed in the M mode is set to 5 fps, and the selectable options in the H mode are 20 fps, 15 fsp, 10 fps, and 5 fps in this case.

FIG. 9 illustrates the state of the options in the L mode in each case and the set state of the continuous shooting speed in the M mode in each case, as the case in which the L mode is set.

The case L1 is a case in which the M mode is set to 20 fps, and the selectable options in the H mode are 20 fps, 15 fsp, 10 fps, and 5 fps in this case.

The case L2 is a case in which the M mode is set to 15 fps, and the selectable options in the H mode are 15 fsp, 10 fps, and 5 fps in this case.

The case L3 is a case in which the M mode is set to 10 fps, and the selectable options in the H mode are 10 fps and 5 fsp in this case.

The case L4 is a case in which the M mode is set to 5 fps, and the selectable option in the H mode is only 5 fps in this case.

FIG. 10 illustrates the state of the options in the M mode in each case and the set states of the continuous shooting speeds in the H mode and the L mode in each case, as the case in which the M mode is set.

The case M1 is a case in which the H mode is set to 20 fps and the L mode is set to 5 fps, and the selectable options in the M mode are 20 fps, 15 fsp, 10 fps, and 5 fps in this case.

The case M2 is a case in which the H mode is set to 15 fps and the L mode is set to 5 fps, and the selectable options in the M mode are 15 fsp, 10 fps, and 5 fps in this case.

The case M3 is a case in which the H mode is set to 10 fps and the L mode is set to 5 fps, and the selectable options in the M mode are 10 fps and 5 fps in this case.

The case M4 is a case in which the H mode is set to 5 fps and the L mode is set to 5 fps, and the selectable option in the M mode is only 5 fps in this case.

The case M5 is a case in which the H mode is set to 20 fps and the L mode is set to 10 fps, and the selectable options in the M mode are 20 fsp, 15 fps, and 10 fps in this case.

The case M6 is a case in which the H mode is set to 15 fps and the L mode is set to 10 fps, and the selectable options in the M mode are 15 fps and 10 fps in this case.

The case M7 is a case in which the H mode is set to 10 fps and the L mode is set to 10 fps, and the selectable option in the M mode is only 10 fps in this case.

The case M8 is a case in which the H mode is set to 20 fps and the L mode is set to 15 fps, and the selectable options in the M mode are 20 fsp and 15 fps in this case.

The case M9 is a case in which the H mode is set to 15 fps and the L mode is set to 15 fps, and the selectable option in the M mode is only 15 fps in this case.

The case M10 is a case in which the H mode is set to 20 fps and the L mode is set to 20 fps, and the selectable option in the M mode is only 20 fps in this case.

As described above, there is a case in which the options in the H mode, the M mode, and the L mode are limited according to the case. That is, in a case in which one continuous shooting mode is to be customized, selectable options in the continuous shooting mode are determined according to the continuous shooting speed set in the continuous shooting mode next to this continuous shooting mode in the high and low order of continuous shooting speeds. That is, in a case in which the selection in the H mode is to be carried out as in FIG. 8, the options are determined according to the setting in the M mode. In a case in which the selection in the L mode is to be carried out as in FIG. 9, the options are determined according to the setting in the M mode. In a case in which the selection in the M mode is to be carried out as in FIG. 10, the options are determined according to the settings in the H mode and the L mode.

Figure 11:
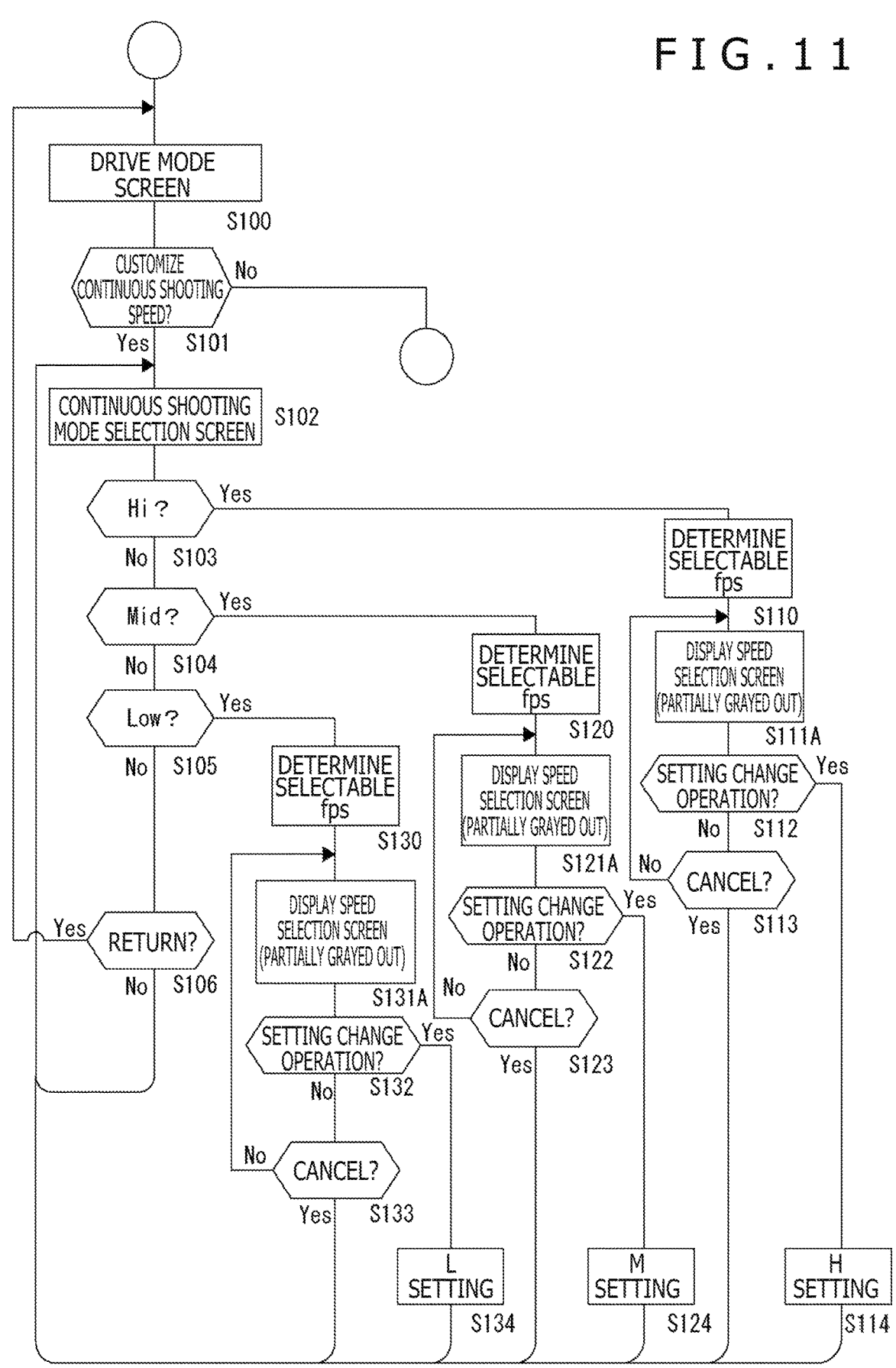
FIG. 11 is a flowchart of a setting processing example according to the second embodiment.

A processing example of the camera control section 21 (setting control section 24) in the second embodiment is illustrated in FIG. 11. Note that the same step number is assigned to the same processing as that of FIG. 7, and a description thereof is omitted.

FIG. 11 is different from FIG. 7 in that Steps S110, S120, and S130 are carried out.

In a case in which the camera control section 21 detects the operation of "Customize Speed Hi" on the continuous shooting mode selection screen 41 as that of FIG. 6B, the camera control section 21 proceeds from Step S103 to Step S110, and determines the options for the continuous shooting speed which can currently be set as the H mode. That is, the camera control section 21 determines the selectable continuous shooting speeds according to the set state at this time in the M mode. The selectable continuous shooting speeds are those in any of the cases H1 to H4 of FIG. 8.

The camera control section 21 then causes the speed selection screen 42 to be displayed in Step S111A. In this state, in such a screen as that of FIG. 6C, the non-selectable continuous shooting speeds are caused to be grayed out, and the cursor is also controlled so as not to be moved to the grayed-out options. Accordingly, the user can select only the continuous shooting speeds set as selectable.

In a case in which the camera control section 21 detects the operation of "Customize Speed Mid" on the continuous shooting mode selection screen 41 as that of FIG. 6B, the camera control section 21 proceeds from Step S104 to Step S120 of FIG. 11, and determines the options for the continuous shooting speed which can currently be set as the M mode. That is, the camera control section 21 determines the selectable continuous shooting speeds according to the set states at this time in the H mode and the L mode. The selectable continuous shooting speeds are those in any of the cases M1 to M10 of FIG. 10.

The camera control section 21 then causes the speed selection screen 42 to be displayed in Step S121A. At this time, the non-selectable continuous shooting speeds are caused to be grayed out, and the cursor is also controlled so as not to be moved to the grayed-out options.

Moreover, in a case in which the camera control section 21 detects the operation of "Customize Speed Low" on the continuous shooting mode selection screen 41 as that of FIG. 6B, the camera control section 21 proceeds from Step S105 to Step S130 of FIG. 11, and determines the options for the continuous shooting speed which can currently be set as the L mode. That is, the camera control section 21 determines the selectable continuous shooting speeds according to the set state at this time in the M mode. The selectable continuous shooting speeds are those in any of the cases L1 to L4 of FIG. 9.

The camera control section 21 then causes the speed selection screen 42 to be displayed in Step S131A. At this time, the non-selectable continuous shooting speeds are caused to be grayed out, and the cursor is also controlled so as not to be moved to the grayed-out options.

With the processing of FIG. 11, the user can customize the continuous shooting speed in each continuous shooting mode in the range in which the relative relation among the speeds set in the respective continuous shooting modes is not inverted with respect to the presented relative highs and lows.

Moreover, as appreciated from FIG. 8, FIG. 9, and FIG. 10, all of or a part of the H mode, the M mode, and the L mode are allowed to have the same continuous shooting speed. As a result, there can be met a request of a user who intentionally wants to set continuous shooting modes having the same continuous shooting speed.

A description is now given of a modification example of the second embodiment.

As the method of allowing the customization within the range in which the relative relation among the speeds set in the respective continuous shooting modes is not inverted with respect to the presented relative highs and lows, there is conceivable an example in which the options for the continuous shooting speed are fixed as follows. For example, the options are fixed as follows.

Options in the H mode: 20 fps and 15 fps

Options in the M mode: 15 fps and 10 fps

Options in the L mode: 10 fps and 5 fps

With this configuration, whatever selection the user makes in each continuous shooting mode, the high-low relation among the continuous shooting speeds is not inverted.

4. THIRD EMBODIMENT

As a third embodiment, a description is now given of an example in which initialization of the settings is enabled.

Figure 12:
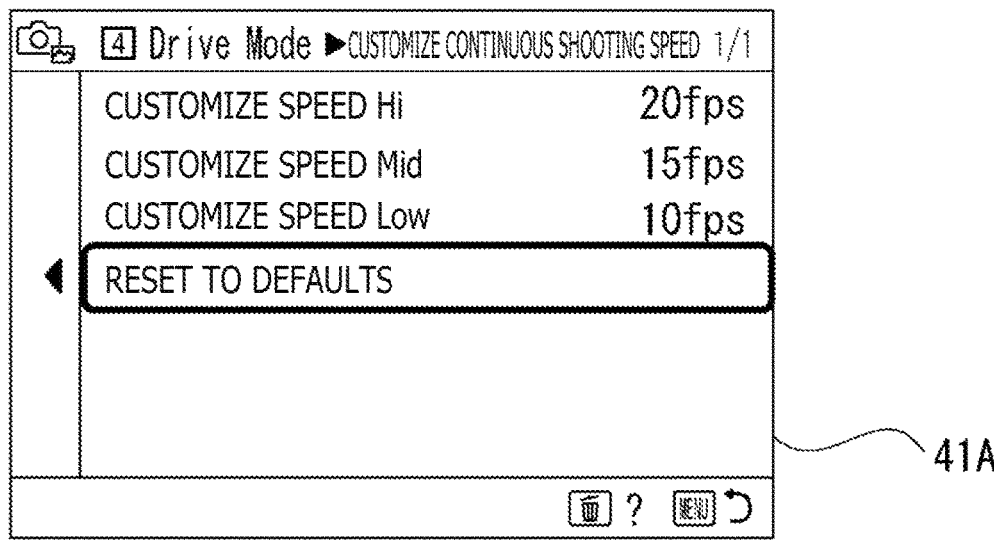
FIG. 12 is an explanatory diagram of a setting screen according to a third embodiment.

For example, the speed selection screen 42 as illustrated in FIG. 6B is changed as illustrated as a speed selection screen 42A of FIG. 12. That is, in addition to the options of the H mode, the M mode, and the L mode, an option of "Reset to Defaults" is provided.

Moreover, the camera control section 21 is caused to carry out processing of FIG. 13. Note that the same step number is assigned to the same processing as that of FIG. 7, and a description thereof is omitted. FIG. 13 is different from FIG. 7 in that Steps S140 and S141 are carried out.

In a case in which the camera control section 21 detects an initialization operation, that is, an operation of selecting "Reset to Defaults," on the continuous shooting mode selection screen 41A such as that of FIG. 12, the camera control section 21 proceeds from Step S140 to Step S141 and carries out processing of resetting each setting in the H mode, the M mode, and the L mode to a default setting.

The camera control section 21 stores in advance default set values of the H mode, the M mode, and the L mode of, for example, an initial setting upon delivery in the memory section 19 as, for example, 20 fps, 10 fps, and 5 fps. Then, in Step S141, the camera control section 21 reads the default set values and sets them as current set values.

With such a function prepared, this function is useful when the user wants to reset the setting to the initial state after the user has optionally made customization.

In particular, when customization having a high degree of freedom as that in the first embodiment is allowed, there may be the case in which the relation between the highs and lows of the continuous shooting speeds set in the respective continuous shooting modes and the indications "H," "M," and "L" may be inverted. As described above, this function is effective in a case in which the user wants to reset the high-low relation from the state in which the high-low relation among the continuous shooting speeds in the H mode, the M mode, and the L mode is inverted.

Note that such processing as automatically resetting the settings to the default setting may be carried out after a certain time has elapsed, without depending on the operation.

Moreover, only in the case in which the relation between the display of the respective continuous shooting modes and the highs and lows of the continuous shooting speeds is inverted by the customization in the first embodiment, the setting automatically may be reset to the default setting when a certain time (for example, one day, one week, one month, or the like) has elapsed. For example, in a case in which the user has forgotten a previous setting or in a case in which another user uses the imaging apparatus 1, it is possible to avoid confusion in carrying out the operation.

5. UI EXAMPLES

A description is now given of various examples of the setting screens 40 (the continuous shooting mode selection screen 41 and the speed selection screen 42) which can be employed in the first, second, and third embodiments. Each of the following examples is implemented by display control by the camera control section 21 (setting control section 24).

FIG. 14 is an example of a continuous shooting mode selection screen 41B substituting for the continuous shooting mode selection screen 41 of FIG. 6B. The continuous shooting mode selection screen 41B displays current set values 43 in the respective continuous shooting modes in addition to the options for the continuous shooting modes. In the example illustrated, it is presented to the user that the current setting is 30 fsp in the H+ mode, 20 fsp in the H mode, 15 fsp in the M mode, and 10 fsp in the L mode.

Desired customization by the user is facilitated by allowing the current setting state to be checked through comparison among the respective continuous shooting modes as described above. Moreover, recognition of a continuous shooting mode to be changed is also facilitated.

FIG. 15 illustrates a speed selection screen 42A substituting for the speed selection screen 42 of FIG. 6C. The speed selection screen 42A is configured such that the continuous shooting speed can be selected based on the number of images captured by the continuous shooting per unit time (for example, one second). For example, there is provided such a configuration that the number of images captured by the continuous shooting can freely be selected in an interval of one image between, for example, 20 images and one image by scrolling options in the up-down direction on the screen.

For example, the degree of freedom of the setting by the user is remarkably increased by allowing the selection in the interval of one image in this way in each of the H mode, the M mode, and the L mode.

Figure 16:
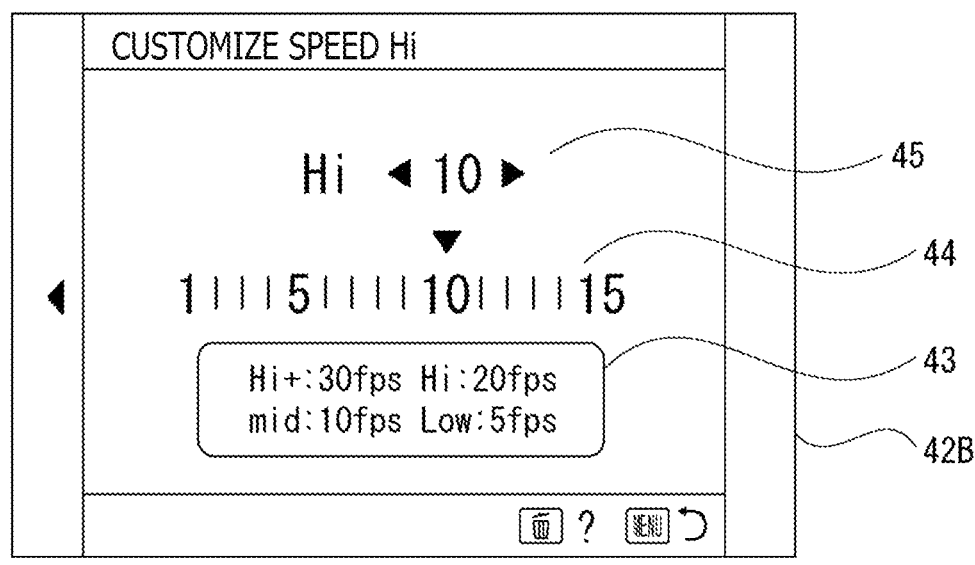
FIG. 16 is an explanatory diagram of an example in which a gauge is used on a setting screen according to the embodiments.

FIG. 16 illustrates a speed selection screen 42B substituting for the speed selection screen 42 of FIG. 6C. The speed selection screen 42A is configured such that the continuous shooting speed can be selected in an interval of one fsp (that is, in the interval of one image as in FIG. 15) by using a cursor operation (for example, an operation of the cross key in a left-right direction) or the like to change specification on a gauge 44. A scale of the gauge 44 is scrolled in the left-right direction to thereby allow free selection of the number of images in the interval of one image between, for example, 20 images and one image, exceeding a range displayed on the screen as illustrated.

A value specified on the gauge 44 is displayed large as a selected value 45.

Instinctive recognition of the settable range by the user is facilitated by using the gauge 44.

Moreover, as current set values 43, the current set value 43 in each continuous shooting mode is displayed. As a result, the user can carry out the selection operation in the continuous shooting mode in which the selection operation is being carried out, while checking the set values in the other continuous shooting modes.

Figure 17:
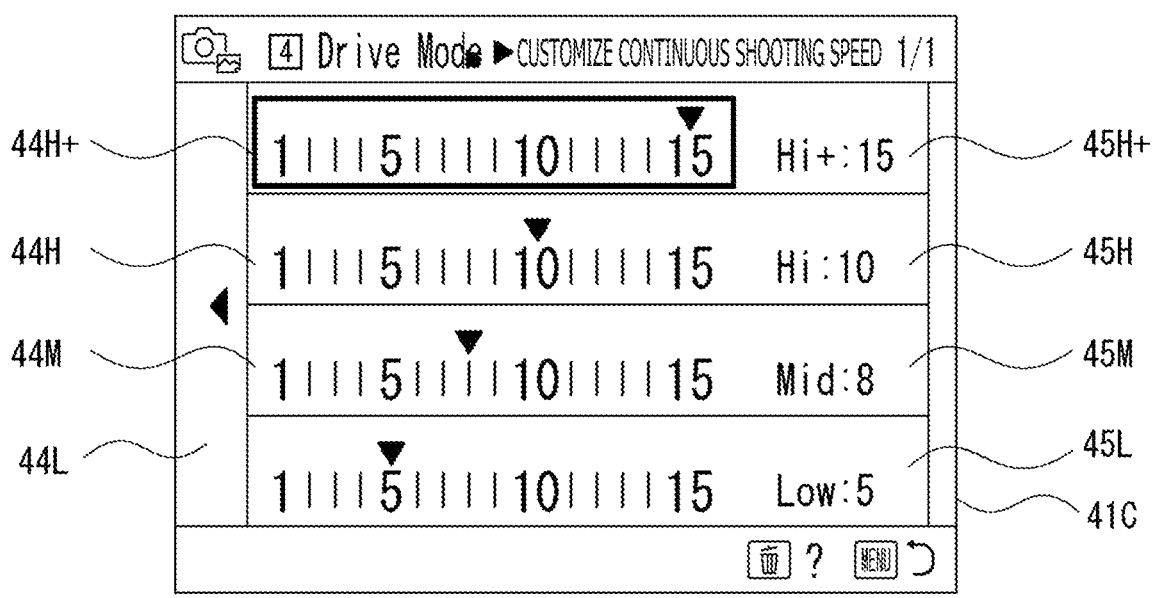
FIG. 17 is an explanatory diagram of an example in which multiple continuous shooting modes are set on a setting screen according to the embodiments.

FIG. 17 is an example of a continuous shooting mode selection screen 41C substituting for the continuous shooting mode selection screen 41 of FIG. 6B. This is an example in which the setting of the continuous shooting speed is allowed also in the H+ mode, and is also an example in which the settings in all of the H+ mode, the H mode, the M mode, and the L mode are allowed on one screen.

A gauge 44H+ for setting the H+ mode, a gauge 44H for setting the H mode, a gauge 44M for setting the M mode, and a gauge 44L for setting the L mode are displayed in the screen, and the continuous shooting speed in each continuous shooting mode is allowed to be selected in an interval of one fsp. Values specified on the respective gauges 44H+, 44H, 44M, and 44L are displayed large as selected values 45H+, 45H, 45M, and 45L.

For example, the user selects one gauge by a cursor operation in the up-down direction (for example, an operation of the cross key in the up-down direction), and then selects a value on the gauge by a cursor operation in the left-right direction (for example, an operation of the cross key in the left-right direction). On each of the gauges 44H+, 44H, 44M, and 44L, a scale is scrolled in the left-right direction, to thereby allow selection in a range, for example, from "0" to "30."

In this example, there is facilitated the selection of each continuous shooting speed by the user, in consideration of the speed relation among the continuous shooting modes, on one screen.

Figure 18:
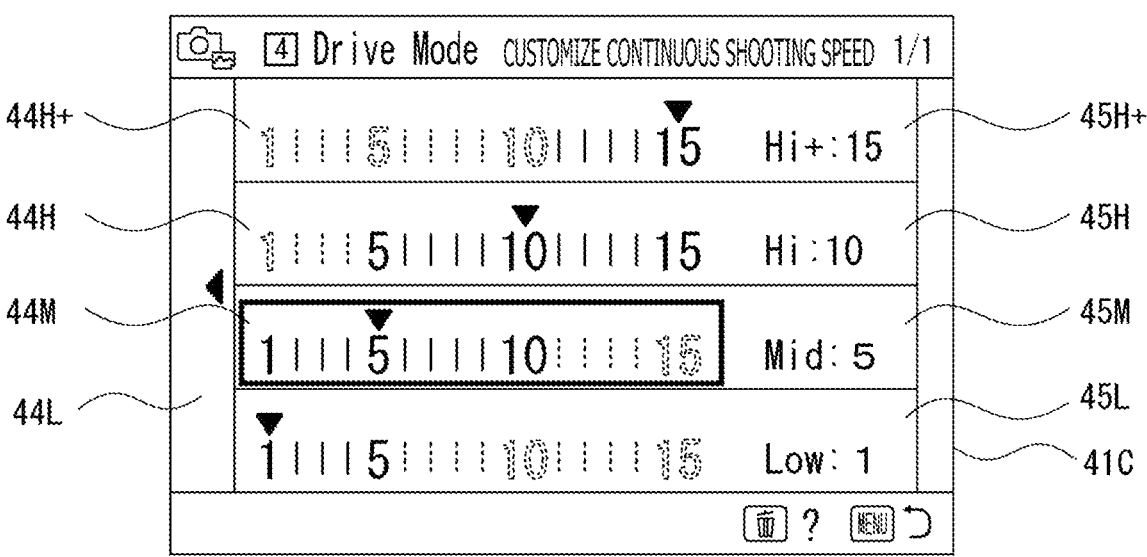
FIG. 18 is an explanatory diagram of an example in which the multiple continuous shooting modes are set on a setting screen according to the embodiments.

FIG. 18 is an example similar to FIG. 17, in which the continuous shooting speed can be selected in each continuous shooting mode by using the gauges 44H+, 44H, 44M, and 44L on one screen, but the selection ranges are limited.

In the illustrated state, values (scales) from "1" to "9" are grayed out in the H+ mode, values from "1" to "4" are grayed out in the H mode, values from "1" to "4" and from "11" to "15" are grayed out in the M mode, and values from "6" to "15" are grayed out in the L mode. The cursor cannot be moved to the grayed-out scales.

For example, with this configuration, it is possible to avoid the inversion of the relation between the indications of the respective continuous shooting modes and the highs and lows of the continuous shooting speeds, as described in the second embodiment.

Note that the range of the grayed-out scales is caused to change according to the set value in the continuous shooting mode or modes next, in the high-low relation, to the continuous shooting mode to be set, as described in the second embodiment.

As another example, the settable range may be fixed in each continuous shooting mode, as described in the modification example of the second embodiment.

6. SUMMARY AND MODIFICATION EXAMPLES

With the imaging apparatus 1 according to the embodiments described above, the following effects can be obtained.

The imaging apparatus 1 according to the embodiments includes the camera control section 21 (setting control section 24) configured to provide, for all or some of the multiple continuous shooting modes, options as multiple continuous shooting speeds including a continuous shooting speed same as that in another continuous shooting mode and carry out the continuous shooting speed setting from the options in each of the continuous shooting modes according to an operation.

For example, in the examples of the first to third embodiments, as the continuous shooting modes selectable by the dial 6a, for example, the H+ mode, the H mode, the M mode, and the L mode are prepared. Of the selectable modes, the user can select and set a continuous shooting speed for each of the H mode, the M mode, and the L mode.

As a result, according to ease of use for the user and the use case, it is possible to select the continuous shooting mode and to selectively use the continuous shooting speed to be selected. Thus, the extremely convenient function can be provided to a cameraman who seeks high-level imaging suitable for each of various cases.

Moreover, in the examples of the first and second embodiments, there is enabled such setting that all of the H mode, the M mode, and the L mode are set to the same continuous shooting speed. This brings about such an effect that imaging at an undesired continuous shooting speed due to switching of the continuous shooting speed by an operation error can be prevented depending on the user or depending on the use case.

Note that, as in the modification example of the second embodiment, there may be provided such a configuration that the same continuous shooting speed can be set in the H mode and the M mode and the same continuous shooting speed can be set in the M mode and the L mode. Even when at least some of the continuous shooting modes in which the continuous shooting speed can variably be set can have the same continuous shooting speed as described above, it is possible to provide preferred usability to the user. For example, for a user who wants variable speeds at three levels for the continuous shooting speed, such a configuration that the M mode and the L mode can be set to the same continuous shooting speed is useful. Moreover, for a user who uses the H+ mode and the H mode while frequently switching therebetween, when the H mode and the M mode can be set to the same continuous shooting speed, the M mode still has the same continuous shooting speed as that in the H mode even after the dial 6a is erroneously turned up to the M mode during the operation thereof, and hence, this configuration is useful as measures against an operation error.

Note that, in the case in which four continuous shooting modes are provided as in the embodiments, the continuous shooting speed can variably be set also in the H+ mode as illustrated in the examples of FIG. 17 and FIG. 18.

Moreover, three continuous shooting modes may be provided as the H mode, the M mode, and the L mode in each of which the continuous shooting speed can variably be set, without providing the H+ mode. As another example, two continuous shooting modes may be provided as the H mode and the L mode in each of which the continuous shooting speed can variably be set.

That is, the continuous shooting speed can variably be set in all of the continuous shooting modes. Moreover, it is conceivable to provide five or more continuous shooting modes.

In each of the embodiments, the multiple continuous shooting modes each having the selectable continuous shooting speed have the same options for the selectable continuous shooting speed as one another.

For example, in the first embodiment, the H mode, the M mode, and the L mode are prepared as the continuous shooting modes each having the selectable continuous shooting speed, and selection can be made from the options, which are "20 fps," "15 fps," "10 fps," and "5 fps," in all of the H mode, the M mode, and the L mode. That is, the user can freely set the continuous shooting speed among the same options for the H mode, the M mode, and the L mode. There may be a case in which it is desired by a skilled cameraman that customization suitable for the cameraman can be made also in consideration of a special use case, a habit in the operation, and the like. Accordingly, it is useful to provide the same options for the three continuous shooting modes, to thereby increase a degree of freedom for the user.

In the embodiments, as appreciated from the indications on the dial 6a of FIG. 2, the multiple continuous shooting modes each having the selectable continuous shooting speed present the relative highs and lows of the respective continuous shooting speeds.

That is, the H mode, the M mode, and the L mode are prepared as the continuous shooting modes each having the selectable continuous shooting speed, and such indications as "H," "M," and "L," for example, are presented on the dial 6a. By presenting such indications of the highs and lows of the continuous shooting speeds, it is possible to facilitate understanding for the user regarding the relation among the continuous shooting speeds in the respective continuous shooting modes, to thereby enhance the usability.

In the second embodiment, there is given the example which allows the variable setting of the continuous shooting speed in each continuous shooting mode within the range in which the relative relation among the speeds set to the respective continuous shooting modes is not inverted with respect to the presented relative highs and lows.

For example, the H mode, the M mode, and the L mode are prepared as the continuous shooting modes each having the selectable continuous shooting speed, and settings are carried out such that the M mode cannot be higher in speed than the H mode, the L mode cannot be higher in speed than the M mode, the H mode cannot be lower in speed than the M mode, and the M mode cannot be lower in speed than the L7 mode.

By enabling to maintain the high-low relation among the indications of the continuous shooting modes as described above, the user can always operate the dial 6a according to the indications of "H," "M," and "L," to thereby enhance the usability.

In the second embodiment, there is given the example in which the camera control section 21 carries out the control of determining and displaying, on the setting screen 40 (speed selection screen 42) for the continuous shooting speed in one continuous shooting mode, the selectable continuous shooting speed according to the continuous shooting speed set in another continuous shooting mode that is next, in a high-low order of continuous shooting speeds, to the one continuous shooting mode (see Steps S110, S120, and S130 of FIG. 11).

As a result, for example, the selection range in the H mode and the selection range in the L mode change according to the setting in the M mode. Moreover, the selection range in the M mode changes according to the setting in the H mode, and the selection range in the M mode changes according to the setting in the L mode. Accordingly, the user can select the continuous shooting speed in one continuous shooting mode according to the set state in the respective continuous shooting modes at that time, within the range in which the high-low relation among the indications of the continuous shooting modes can be maintained.

In the second embodiment, there is given the example in which the camera control section 21 carries out the control of causing the continuous shooting speed determined as non-selectable in a continuous shooting mode to be displayed in a non-selectable state on the setting screen for the continuous shooting speed in the continuous shooting mode (see Step S111, S121, and S131 of FIG. 11). For example, the non-selectable continuous shooting speed is displayed in a grayed-out state.

As a result, the user can carry out the selection operation in consideration of the non-selectable continuous shooting speeds set in order to maintain the high-low relation.

In the third embodiment, there is given the example in which the camera control section 21 carries out the processing of resetting the settings of the continuous shooting speeds in the multiple continuous shooting modes each having the selectable continuous shooting speed, to the initial state in response to a setting initialization operation (see Steps S140 and S141 of FIG. 13).

There may occur such a case that the high-low relation among the continuous shooting speeds in the H mode, the M mode, and the L mode does not hold due to such a configuration that the continuous shooting speed is allowed to be freely changed in each continuous shooting mode. Moreover, there is also expected a case in which resetting to the default state is required due to a change in use case after the customization and the like. It is preferred that the initialization operation be enabled in order to cope with these cases.

In the embodiments, there is given the example in which the camera control section 21 carries out the control of causing the current set value of the continuous shooting speed in each continuous shooting mode to be displayed on the setting screen 40 for the continuous shooting speed in one continuous shooting mode. The current set values 43 on the continuous shooting mode selection screen 41B of FIG. 14 and the current set values 43 on the speed selection screen 42B of FIG. 16 are the examples.

By causing the current set value 43 in each continuous shooting mode to be displayed in this way, the user can change the continuous shooting speed in each continuous shooting mode while checking the current setting in each continuous shooting mode.

In the embodiments, there is given the example in which the camera control section 21 carries out the control of causing a value indicating the number of still images to be recorded per unit time to be presented as an option for the continuous shooting speed. For example, on the setting screen for the user to variably set the continuous shooting speed, fps display or display of the number of still images is used to display the continuous shooting speed (see FIG. 6C and FIG. 15).

As a result, the user can set the continuous shooting speed while clearly recognizing the number of still images to be captured and recorded through the continuous shooting in each continuous shooting mode.

In the embodiments, there is given the example in which the camera control section 21 carries out the control of allowing the selection of the continuous shooting speed by the operation of specifying the number of still images to be recorded per unit time. For example, there is provided the user interface which allows the user to specify the number of still images recorded per second, in an interval of one image (see FIG. 15 and FIG. 16).

With this configuration, the user can specify the number of still images (the number of frames) recorded per second, as the continuous shooting speed in each continuous shooting mode. Accordingly, the continuous shooting speed setting having a high degree of freedom for the user can be carried out.

In the embodiments, there is given the example in which the camera control section 21 carries out the control of allowing the selection of the continuous shooting speed by the operation of specifying the number of still images to be recorded per unit time, with use of the cursor on the gauge 44 (see FIG. 16, FIG. 17, and FIG. 18).

With the interface examples of FIG. 16 and the like, the user can specify the continuous shooting speed on the gauge 44 on the basis of the number of still images (the number of frames) recorded per second. The display with the gauge 44 facilitates instinctive recognition of the set value by the user.

Note that, in the example of FIG. 16, the current set values 43 are simultaneously displayed, and hence, the user can carry out the variable operation while checking the relative relation among the continuous shooting speeds in the respective continuous shooting modes.

In the embodiments, there is given the example in which the camera control section 21 carries out the control of performing the display that allows the continuous shooting speed setting in the multiple continuous shooting modes to be carried out within one screen (see FIG. 17 and FIG. 18).

With such a UI example, the user can easily carry out the continuous shooting speed settings in the respective continuous shooting modes collectively while recognizing the relative relation thereof.

In the embodiments, there is given the example in which there is provided the operation element configured to make a selection from the imaging operation modes including the multiple continuous shooting modes and the single shooting mode.

That is, switching can be carried out among the single shooting mode and the multiple continuous shooting modes (for example, the H+ mode, the H mode, the M mode, and the L mode) with use of the dial 6a. As a result, it is possible to selectively use with ease the still image recording by the single shooting and the continuous shooting recording at various continuous shooting speeds.

Note that the continuous shooting mode may be switched by not the dial operation element, but an operation element in another form such as a touch panel, a lever, or the like.

In the embodiments, there is given the example in which, as some of the multiple continuous shooting modes, the continuous shooting mode is provided in which the continuous shooting speed that is unable to be set in the multiple continuous shooting modes each having the selectable continuous shooting speed is fixedly set.

In the first, second, and third embodiments, for example, the H+ mode is the mode having the fixed continuous shooting speed, and has the continuous shooting speed which is unable to be set in any of the H mode, the M mode, or the L mode. By providing such an H+ mode, the continuous shooting speed switching function can be maintained even in a state in which, for example, the H mode, the M mode, and the L mode are set to the same continuous shooting speed.

Note that the modes presenting the meanings of the super high speed, the light speed, the middle speed, and the low speed are provided as "H+ mode," "H mode," "M mode," and "L mode" in the embodiments, but there may be provided mode names which do not present the relative speed relation (or mode names with which the relative speed relation is less likely to be recognized). For example, the mode names such as "speed A mode," "speed B mode," and "speed C mode" from which the speed relation is less likely to be recognized may be used.

Note that, in the embodiments, there is exemplified the imaging apparatus 1 to which the temporary storage section 26 (the frame memories 26A and 26B) is mounted to thereby carry out the blackout-free operation, but the technology according to the present disclosure can be applied also to the imaging apparatus 1 to which the temporary storage section 26 is not mounted.

The program according to the embodiments is a program which causes an arithmetic operation processing apparatus, for example, a CPU, to carry out the setting control for the continuous shooting speed described above.

That is, the program according to the embodiments is a program which causes the arithmetic operation processing apparatus to carry out the control of allowing the selection of, for all or some of the multiple continuous shooting modes, multiple continuous shooting speeds including a continuous shooting speed same as that in another continuous shooting mode, and carrying out the continuous shooting speed setting in each continuous shooting mode according to an operation.

With such a program, the camera control section 21 described above can be implemented by the arithmetic operation processing apparatus such as a microcomputer.

Such a program can be recorded in advance in an HDD used as a storage medium built in equipment such as a computer apparatus, a ROM in a microcomputer having a CPU, and the like. Moreover, as another example, the program can temporarily or permanently be stored (recorded) in a removable recording medium such as a flexible disc, a CD-ROM (Compact Disc Read Only Memory), an MO (Magneto Optical) disc, a DVD (Digital Versatile Disc), a Blu-ray Disc (registered trademark), a magnetic disc, a semiconductor memory, and a memory card. Such a removable recording medium can be provided as what is generally called package software.

Moreover, such a program can be installed in a personal computer or the like from the removable recording medium or can be downloaded from a download website via a network such as a LAN (Local Area Network) or the Internet.

Incidentally, in the embodiments, there is described the example in which, as the multiple "frame rate modes," the multiple "continuous shooting modes" are assumed.

The technology described in the embodiments can be applied to various frame rate modes.

For example, there are provided multiple LV image frame rate modes in each of which a frame rate of a live view image can be set. Then, in each LV image frame rate mode, the frame rate of the live view image may be set according to an operation of selection from options.

Moreover, there are provided multiple motion image frame rate modes in each of which a frame rate in motion image capturing can be set. Then, in each motion image frame rate mode, the frame rate of a motion image to be captured and recorded may be set according to an operation of selection from options.

Note that the effects described in the present specification are examples and are not limitative, and there may exist other effects.

Note that the present technology can also adopt the following configurations.

(1)

An imaging apparatus including:

a control section configured to provide, for all or some of multiple frame rate modes, options for a frame rate same as options in another frame rate mode and carry out frame rate setting from the multiple options in each of the multiple frame rate modes according to an operation.

(2)

The imaging apparatus according to (1) above, in which the multiple frame rate modes each having the selectable frame rate have the options same as one another.

(3)

The imaging apparatus according to (1) or (2) above, in which the control section causes a presentation section to present a relative high-low relation among the respective frame rates in the multiple frame rate modes each having the selectable frame rate.

(4)

The imaging apparatus according to any of (1) to (3) above, in which the control section causes presentation of a relative high-low relation among the respective frame rates in the multiple frame rate modes each having the selectable frame rate, and allows variable setting of the frame rate in each frame rate mode within a range in which a relative relation among the frame rates set to the respective frame rate modes is not inverted with respect to the presented relative high-low relation.

(5)

The imaging apparatus according to (4) above, in which the control section carries out control of determining and displaying, on a setting screen for the frame rate in one frame rate mode, a selectable frame rate according to the frame rate set in another frame rate mode that is next, in a high-low order of frame rates, to the one frame rate mode to be set.

(6)

The imaging apparatus according to (5) above, in which, on the setting screen for the frame rate in the one frame rate mode, the control section carries out control of causing a frame rate determined as non-selectable in the one frame rate mode to be set to be displayed in a non-selectable state.

(7)

The imaging apparatus according to any of (1) to (6) above, in which the control section carries out processing of resetting settings of the frame rates in the multiple frame rate modes each having the selectable frame rate, to an initial state in response to a setting initialization operation.

(8)

The imaging apparatus according to any of (1) to (7) above, in which the control section carries out control of causing a current set value of the frame rate in each frame rate mode to be displayed on a setting screen for the frame rate in one frame rate mode.

(9)

The imaging apparatus according to any of (1) to (8) above, in which the control section carries out control of causing a value indicating the number of still images to be recorded per unit time to be presented as an option for the frame rate.

(10)

The imaging apparatus according to any of (1) to (9) above, in which the control section carries out control of allowing selection of the frame rate by an operation of specifying the number of still images to be recorded per unit time.

(11)

The imaging apparatus according to any of (1) to (10) above, in which the control section carries out control of allowing selection of the frame rate by an operation of specifying the number of still images to be recorded per unit time, with use of a cursor on a gauge.

(12)

The imaging apparatus according to any of (1) to (11) above, in which the control section carries out control of performing display that allows the frame rate setting in the multiple frame rate modes to be carried out within one screen.

(13)

The imaging apparatus according to any of (1) to (12) above, further including:

an operation element configured to make a selection from imaging operation modes including the multiple frame rate modes and a single shooting mode.

(14)

The imaging apparatus according to any of (1) to (13) above, in which, as some of the multiple frame rate modes, a frame rate mode is provided in which a frame rate that is unable to be set in the multiple frame rate modes each having the selectable frame rate is fixedly set.

(15)

The imaging apparatus according to any of (1) to (14) above, in which the multiple frame rate modes are multiple continuous shooting modes, and a selectable frame rate is a frame rate corresponding to a continuous shooting speed.

(16)

An imaging control method executed by an imaging control apparatus, including:

providing, for all or some of multiple frame rate modes, options for a frame rate same as options in another frame rate mode; and carrying out control to perform frame rate setting from the multiple options in each of the multiple frame rate modes according to an operation.

(17)

A program causing an arithmetic operation processing apparatus to carry out:

provision of, for all or some of multiple frame rate modes, options for a frame rate same as options in another frame rate mode; and control to perform frame rate setting from the multiple options in each of the multiple frame rate modes according to an operation.

Moreover, the present technology can also adopt the following configurations.

(101)

An imaging apparatus including:

a control section configured to provide, for all or some of multiple continuous shooting modes, options as multiple continuous shooting speeds including a continuous shooting speed same as that in another continuous shooting mode and carry out continuous shooting speed setting from the multiple options in each of the multiple continuous shooting modes according to an operation.

(102)

The imaging apparatus according to (101) above, in which the multiple continuous shooting modes each having the selectable continuous shooting speed have the options same as one another.

(103)

The imaging apparatus according to (101) or (102) above, in which the control section causes a presentation section to present a relative high-low relation among the respective continuous shooting speeds in the multiple continuous shooting modes each having the selectable continuous shooting speed.

(104)

The imaging apparatus according to any of (101) to (103) above, in which the control section causes presentation of a relative high-low relation among the respective continuous shooting speeds in the multiple continuous shooting modes each having the selectable continuous shooting speed, and allows variable setting of the continuous shooting speed in each continuous shooting mode within a range in which a relative relation among the speeds set to the respective continuous shooting modes is not inverted with respect to the presented relative high-low relation.

(105)

The imaging apparatus according to (104) above, in which the control section carries out control of determining and displaying, on a setting screen for the continuous shooting speed in one continuous shooting mode, a selectable continuous shooting speed according to the continuous shooting speed set in another continuous shooting mode that is next, in a high-low order of continuous shooting speeds, to the one continuous shooting mode to be set.

(106)

The imaging apparatus according to (105) above, in which, on the setting screen for the continuous shooting speed in the one continuous shooting mode, the control section carries out control of causing a continuous shooting speed determined as non-selectable in the one continuous shooting mode to be set to be displayed in a non-selectable state.

(107)

The imaging apparatus according to any of (101) to (106) above, in which the control section carries out processing of resetting settings of the continuous shooting speeds in the multiple continuous shooting modes each having the selectable continuous shooting speed, to an initial state in response to a setting initialization operation.

(108)

The imaging apparatus according to any of (101) to (107) above, in which the control section carries out control of causing a current set value of the continuous shooting speed in each continuous shooting mode to be displayed on a setting screen for the continuous shooting speed in one continuous shooting mode.

(109)

The imaging apparatus according to any of (101) to (108) above, in which the control section carries out control of causing a value indicating the number of still images to be recorded per unit time to be presented as an option for the continuous shooting speed.

(110)

The imaging apparatus according to any of (101) to (109) above, in which the control section carries out control of allowing selection of the continuous shooting speed by an operation of specifying the number of still images to be recorded per unit time.

(111)

The imaging apparatus according to any of (101) to (110) above, in which the control section carries out control of allowing selection of the continuous shooting speed by an operation of specifying the number of still images to be recorded per unit time, with use of a cursor on a gauge.

(112)

The imaging apparatus according to any of (101) to (111) above, in which the control section carries out control of performing display that allows the continuous shooting speed setting in the multiple continuous shooting modes to be carried out within one screen.

(113)

The imaging apparatus according to any of (101) to (112) above, further including:

an operation element configured to make a selection from imaging operation modes including the multiple continuous shooting modes and a single shooting mode.

(114)

The imaging apparatus according to any of (101) to (113) above, in which, as some of the multiple continuous shooting modes, a continuous shooting mode is provided in which a continuous shooting speed that is unable to be set in the multiple continuous shooting modes each having the selectable continuous shooting speed is fixedly set.

(115)

An imaging control method executed by an imaging control apparatus, including:

providing, for all or some of multiple continuous shooting modes, options as multiple continuous shooting speeds including a continuous shooting speed same as that in another continuous shooting mode; and carrying out control to perform continuous shooting speed setting from the multiple options in each of the multiple continuous shooting modes according to an operation.

(116)

A program causing an arithmetic operation processing apparatus to carry out:

provision of, for all or some of multiple continuous shooting modes, options as multiple continuous shooting speeds including a continuous shooting speed same as that in another continuous shooting mode; and control to perform continuous shooting speed setting from the multiple options in each of the multiple continuous shooting modes according to an operation.

REFERENCE SIGNS LIST

1: Imaging apparatus
4: Rear monitor
5: EVF
6*a*: Dial
15: Display section
19: Memory section
21: Camera control section
24: Setting control section

30: Drive mode screen
40: Setting screen
41, 41A, 41B, 41C: Continuous shooting mode selection screen
42, 42A, 42B: Speed selection screen
43: Current set value
44: Gauge
45: Selected value

The invention claimed is:

1. An apparatus for controlling an imaging device, the apparatus comprising:

a memory storing program code, and at least one processor configured to execute the program code to perform operations comprising:

displaying a mode selection interface, the mode selection interface including a plurality of different still-image continuous shooting speed categories;

receiving a selection of one of the plurality of different still-image continuous shooting speed categories;

in response to receiving the selection of one of the plurality of different still-image continuous shooting speed categories, displaying a speed selection interface, the speed selection interface including a plurality of discrete shooting speeds, wherein the plurality of discrete shooting speeds include a first shooting speed of a first number of still images per second, a second shooting speed of a second number of still images per second, the second number being higher than the first number, and a third shooting speed of a third number of still images per second, the third number being higher than the second number;

receiving a current shooting speed selection; and in response to receiving the current shooting speed selection, rendering at least one of the plurality of discrete shooting speeds shown in the speed selection interface other than the current shooting speed selection as non-selectable.

2. The apparatus according to claim 1, wherein the plurality of different still-image continuous shooting speed categories include a first shooting speed category, a second shooting speed category, and a third shooting speed category, the first shooting speed category being lower than the second shooting speed category, the second shooting speed category being lower than the third shooting speed category.

3. A non-transitory computer readable medium storing program code for controlling an imaging device, the program code being executable by a processor to perform operations comprising:

displaying a mode selection interface, the mode selection interface including a plurality of different still-image continuous shooting speed categories;

receiving a selection of one of the plurality of different still-image continuous shooting speed categories;

in response to receiving the selection of one of the plurality of different still-image continuous shooting speed categories, displaying a speed selection interface, the speed selection interface including a plurality of discrete shooting speeds, wherein the plurality of discrete shooting speeds include a first shooting speed of a first number of still images per second, and a second shooting speed of a second number of still images per second, the second number being higher than the first number, and a third shooting speed of a third number of still images per second, the third number being higher than the second number;

receiving a current shooting speed selection; and in response to receiving the current shooting speed selection, rendering at least one of the plurality of discrete shooting speeds shown in the speed selection interface other than the current shooting speed selection as non-selectable.

4. The non-transitory computer readable medium according to claim 3, wherein the plurality of different still-image continuous shooting speed categories include a first shooting speed category, a second shooting speed category, and a third shooting speed category, the first shooting speed category being lower than the second shooting speed category, the second shooting speed category being lower than the third shooting speed category.

5. A method for controlling an imaging device, the method comprising:

displaying a mode selection interface, the mode selection interface including a plurality of different still-image continuous shooting speed categories;

receiving a selection of one of the plurality of different still-image continuous shooting speed categories;

in response to receiving the selection of one of the plurality of different still-image continuous shooting speed categories, displaying a speed selection interface, the speed selection interface including a plurality of discrete shooting speeds, wherein the plurality of discrete shooting speeds include a first shooting speed of a first number of still images per second, and a second shooting speed of a second number of still images per second, the second number being higher than the first number, and a third shooting speed of a third number of still images per second, the third number being higher than the second number;

receiving a current shooting speed selection; and in response to receiving the current shooting speed selection, rendering at least one of the plurality of discrete shooting speeds shown in the speed selection interface other than the current shooting speed selection as non-selectable.

6. The method according to claim 5, wherein the plurality of different still-image continuous shooting speed categories include a first shooting speed category, a second shooting speed category, and a third shooting speed category, the first shooting speed category being lower than the second shooting speed category, the second shooting speed category being lower than the third shooting speed category.

*    *    *    *    *